United States Patent
Zhu et al.

(10) Patent No.: US 10,547,735 B2
(45) Date of Patent: *Jan. 28, 2020

(54) CALIBRATION OF MEASUREMENT BIAS OF A BAROMETRIC SENSOR IN A WIRELESS TERMINAL

(71) Applicant: Polaris Wireless, Inc., Mountain View, CA (US)

(72) Inventors: Jian Zhu, Tustin, CA (US); Jerome Arthur Blaha, Jr., Redwood City, CA (US); Scot Douglas Gordon, Redmond, WA (US); Jonathan Shiao-en Lu, San Jose, CA (US); Jeffrey Noel Wu, Santa Clara, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/522,643

(22) Filed: Jul. 25, 2019

(65) Prior Publication Data
US 2019/0349467 A1  Nov. 14, 2019

Related U.S. Application Data

(63) Continuation of application No. 16/028,706, filed on Jul. 6, 2018, now Pat. No. 10,412,211, and a
(Continued)

(51) Int. Cl.
*H04W 24/00* (2009.01)
*H04M 1/725* (2006.01)
(Continued)

(52) U.S. Cl.
CPC .......... *H04M 1/72569* (2013.01); *G01C 5/06* (2013.01); *G01C 25/00* (2013.01); *H04L 67/18* (2013.01);
(Continued)

(58) Field of Classification Search
CPC ......... H04M 1/72569; H04M 2250/12; H04M 1/72519; H04M 1/72522; G01C 5/06;
(Continued)

(56) References Cited

U.S. PATENT DOCUMENTS 6,518,918 B1  2/2003  Vannucci et al.
6,944,465 B2  9/2005  Spain et al.
(Continued)

OTHER PUBLICATIONS

"Restriction and/or election requirement," issued in U.S. Appl. No. 16/028,706, dated Mar. 28, 2019.
(Continued)

*Primary Examiner* — Danh C Le
(74) *Attorney, Agent, or Firm* — McGeary Cukor LLC; Kenneth Ottesen; Jason Paul DeMont

(57) ABSTRACT

A location engine that estimates the barometric pressure measurement bias of a wireless terminal, resulting in an improved estimate of elevation of the wireless terminal. The location engine generates an estimate of measurement bias by comparing the barometric pressure measured by the wireless terminal while at that elevation and the barometric pressure that corresponds to an estimated elevation of the wireless terminal when it made the pressure measurement (i.e., the expected pressure). The estimated elevation is based on an inferred above-ground height and the local terrain elevation, and the expected pressure is based on the measurement of barometric pressure at the pressure reference and the estimated elevation. The location engine infers the height based on various techniques disclosed herein. The location engine can use the measurement bias to adjust subsequent pressure measurements reported by the wireless terminal, in order to generate an improved estimate of elevation of the wireless terminal.

20 Claims, 13 Drawing Sheets

Related U.S. Application Data continuation of application No. 15/982,726, filed on May 17, 2018, now Pat. No. 10,367,932.

(60) Provisional application No. 62/653,188, filed on Apr. 5, 2018.

(51) Int. Cl.
| | |
|---|---|
| *H04W 4/02* | (2018.01) |
| *G01C 5/06* | (2006.01) |
| *G01C 25/00* | (2006.01) |
| *H04L 29/08* | (2006.01) |
| *H04W 88/02* | (2009.01) |

(52) U.S. Cl.
CPC .......... *H04W 4/02* (2013.01); *H04M 1/72519* (2013.01); *H04M 1/72522* (2013.01); *H04M 2250/12* (2013.01); *H04W 88/02* (2013.01)

(58) Field of Classification Search
CPC .......... G01C 25/00; H04L 67/18; H04W 4/02; H04W 88/02
USPC .......... 455/456.1, 456.6, 418, 550.1
See application file for complete search history.

(56) References Cited

U.S. PATENT DOCUMENTS

| | | | |
|---|---|---|---|
| 7,263,442 B2 | 8/2007 | Eckel | |
| 7,433,695 B2 | 9/2008 | Gordon et al. | |
| 8,280,451 B1* | 10/2012 | Zheng | H04M 1/6091 |
| | | | 379/88.21 |
| 8,938,210 B1 | 1/2015 | Otto et al. | |
| 9,119,165 B2 | 8/2015 | Krasner et al. | |
| 9,220,080 B1* | 12/2015 | Martin | H04W 64/00 |
| 9,237,423 B1 | 1/2016 | Blaha, Jr. et al. | |
| 9,432,811 B2 | 8/2016 | De Lorenzo et al. | |
| 9,596,571 B1* | 3/2017 | Gordon | H04W 4/025 |
| 10,149,107 B2 | 12/2018 | Na et al. | |
| 10,367,932 B1* | 7/2019 | Zhu | H04M 1/72569 |
| 2005/0272447 A1 | 12/2005 | Eckel | |
| 2010/0099433 A1 | 4/2010 | Wigren | |
| 2010/0273488 A1* | 10/2010 | Kim | H04W 24/10 |
| | | | 455/436 |
| 2012/0162013 A1 | 6/2012 | Piersol | |
| 2012/0290253 A1 | 11/2012 | Barrett et al. | |
| 2013/0035110 A1 | 2/2013 | Sridhara et al. | |
| 2013/0217410 A1 | 8/2013 | Ku et al. | |
| 2014/0012529 A1 | 1/2014 | Lee et al. | |
| 2014/0066088 A1* | 3/2014 | Bhattacharya | H04W 64/00 |
| | | | 455/456.1 |
| 2014/0135040 A1 | 5/2014 | Edge et al. | |
| 2014/0249788 A1* | 9/2014 | Marchand | G06F 17/5009 |
| | | | 703/6 |
| 2014/0274151 A1 | 9/2014 | Pattabiraman et al. | |
| 2015/0133145 A1 | 5/2015 | Palanki et al. | |
| 2015/0161882 A1 | 6/2015 | Left | |
| 2015/0233713 A1 | 8/2015 | Wolf | |
| 2015/0247917 A1 | 9/2015 | Gum et al. | |
| 2015/0292885 A1 | 10/2015 | Sasaki | |
| 2015/0317890 A1* | 11/2015 | Ten Kate | A61B 5/1117 |
| | | | 702/141 |
| 2015/0341765 A1 | 11/2015 | Macias et al. | |
| 2016/0021007 A1* | 1/2016 | Shuman | H04W 76/23 |
| | | | 370/235 |
| 2016/0044464 A1* | 2/2016 | De Lorenzo | H04W 4/025 |
| | | | 455/456.1 |
| 2016/0047649 A1 | 2/2016 | Edge et al. | |
| 2016/0102995 A1 | 4/2016 | Gum et al. | |
| 2016/0245716 A1 | 8/2016 | Gum et al. | |
| 2017/0075037 A1 | 3/2017 | Springer | |
| 2017/0082729 A1* | 3/2017 | Bar-Shalom | G01S 5/10 |
| 2017/0219342 A1 | 8/2017 | Morioka | |
| 2017/0225921 A1 | 8/2017 | Scoville et al. | |
| 2017/0300599 A1 | 10/2017 | Becerik-Gerber et al. | |
| 2019/0124476 A1* | 4/2019 | Blaha, Jr. | G08B 13/08 |

OTHER PUBLICATIONS

"Notice of Allowance, issued in U.S. Appl. No. 16/028,706", dated Jun. 10, 2019.

"Notice of Allowance, issued in parent U.S. Appl. No. 14/472,600", dated Sep. 25, 2015.

Andy Walker, "Natural Ventilation", "WBDG Whole Building Design Guide", Jun. 15, 2010, Publisher: National Institute of Building Sciences (2014), Published in: US.

"The Stack Effect: When Buildings Act Like Chimneys", "Green Building Advisor (http://www.greenbuildingadvisor.com)", 2013, Publisher: The Taunton Press, Inc., Published in: US.

Office action issued in U.S. Appl. No. 14/960,577, dated May 20, 2016.

CMHUI@HKU.HK, "Lecture: Air Movement and Natural Ventilation", Aug. 17, 2001, Publisher: The University of Hong Kong / Department of Agriculture (http://www.arch.hku.hk/), Published in: HK.

"Definition of 'Stack Effect'", "http://en.wikipedia.org/w/index.php?title=Stack_effect&oldid=601932011", , Publisher: Wikipedia, the free encyclopedia, Published in: US.

"Definition of 'Solar updraft tower'", "http://en.wikipedia.org/w/index.php?title=Solar_updraft_tower&oldid=612364746", , Publisher: Wikipedia, the free encyclopedia, Published in: US.

"Notice of Allowance" dated Jul. 8, 2016 in related U.S. Appl. No. 14/472,574.

Office action issued in U.S. Appl. No. 14/960,577, dated Feb. 2, 2016.

"Notice of Allowance, issued in U.S. Appl. No. 14/960,577", dated Aug. 5, 2016.

"Office action, issued in U.S. Appl. No. 15/982,726", dated Dec. 13, 2018.

"Requirement for Restriction, issued in U.S. Appl. No. 15/982,726", dated Aug. 27, 2018.

"Office action," issued in U.S. Appl. No. 15/982,726, dated Jan. 25, 2019.

"Notice of allowance and fee(s) due," issued in U.S. Appl. No. 15/982,726, dated May 20, 2019.

* cited by examiner

CALIBRATION OF MEASUREMENT BIAS OF A BAROMETRIC SENSOR IN A WIRELESS TERMINAL

CROSS REFERENCE TO RELATED APPLICATIONS

The following document is incorporated by reference herein: U.S. Provisional Application Ser. No. 62/653,188, filed Apr. 5, 2018. If there are any contradictions or inconsistencies in language between this application and any document that has been incorporated by reference that might affect the interpretation of the claims in this application, the claims in this application should be interpreted to be consistent with the language in this application. This application is also related to "Calibration of Measurement Bias of a Barometric Sensor in a Wireless Terminal," U.S. application Ser. No. 15/982,726, incorporated by reference herein. This application is also related to "Calibration of Measurement Bias of a Barometric Sensor in a Wireless Terminal," U.S. application Ser. No. 16/028,706, incorporated by reference herein.

FIELD OF THE INVENTION

The present invention relates to telecommunications in general and, more particularly, to a technique for calibrating a barometric sensor in a wireless terminal to account for measurement bias and using pressure measurements at the calibrated sensor for estimating the elevation of the wireless terminal.

BACKGROUND OF THE INVENTION

The salient advantage of wireless telecommunications over wireline telecommunications is that the user of the wireless terminal is afforded the opportunity to use his or her terminal anywhere. On the other hand, the salient disadvantage of wireless telecommunications lies in that fact that because the user is mobile, an interested party might not be able to readily ascertain the location of the user.

Such interested parties might include both the user of the wireless terminal and a remote party. There are a variety of reasons why the user of a wireless terminal might be interested in knowing his or her location. For example, the user might be interested in telling a remote party where he or she is or, alternatively, the user might seek advice in navigation.

In addition, there are a variety of reasons why a remote party might be interested in knowing the location of the user. For example, the recipient of an E 9-1-1 emergency call from a wireless terminal might be interested in knowing the location of the wireless terminal so that emergency services vehicles can be dispatched to that location.

There are many techniques in the prior art for estimating the location of a wireless terminal. In accordance with some techniques, the location of a wireless terminal is estimated, at least in part, from signal measurements that are reported by the wireless terminal. The reported measurements are of signals measured by the wireless terminal that are transmitted by one or more base stations and, in some cases, by Global Positioning System (GPS) satellites. In order for these techniques to work, at least some of the transmitted signals have to be strong enough to allow for accurate measurement by the wireless terminal and for reliable processing by the particular estimation technique. Some of these techniques work well even in environments where the measured strengths of the different signals vary significantly, such as where signal obstructions are present, including natural obstructions such as mountains and artificial obstructions such as buildings.

There are also techniques in the prior art for estimating the elevation of a wireless terminal. Some of these techniques rely on the relationship between atmospheric pressure, $P_A$, and elevation, $Z_A$, in which $P_A$ decreases logarithmically with $Z_A$, according to the formula:

$$Z_A = H \ln\left(\frac{P_A}{P_0}\right) \qquad \text{(Eq. 1)}$$

wherein $P_0$ is the reference atmospheric pressure, and

H is the scale height of the atmosphere, which is the elevation at which the atmospheric pressure has decreased to $e^{-1}$ times its value at mean sea level (e.g., approximately 7000 meters).

It is well known in the prior art how to estimate the elevation of an object—such as an airplane—using Equation 1. Aircraft altimeters have used this technique for decades, and it is well known to be highly accurate. Furthermore, it is well known in the prior art how to estimate the elevation of a wireless terminal using Equation 1.

In order to obtain barometrically a good estimate of elevation (also known as a "z-estimate"), it is necessary to have both i) a good pressure measurement at the location for which the estimate of elevation is being determined and ii) a good pressure reference. The pressure reference can serve as an estimate of the sea-level pressure for a location of interest.

SUMMARY OF THE INVENTION

A wireless terminal that is capable of measuring barometric pressure can be used to provide pressure measurements that are needed to determine barometrically the terminal's elevation at its current position. In order to determine the elevation of the wireless terminal, however, it is necessary to consider various sources of error, including i) the pressure measurement bias of the wireless terminal's barometric sensor device and ii) the pressure measurement drift of the sensor device.

The pressure measurement bias of the sensor device is typically between 2 and 10 meters in height variation (versus equivalent pressure variation) and can be as much as 40 meters in height variation. The measurement bias can vary across barometric sensor devices of different manufacturers and even across different production batches of the same manufacturer.

The pressure measurement drift of the sensor device is typically between 0 and 5 meters in height equivalent within a month and can be different from one device to another. The drift can be attributed to one or more of the aging of the measuring membrane of the electronic sensor chip, MEMS sensor temperature/humidity cycling, internal IC stresses, and plastic deformation to the sensor. Because of these error sources, the drift (and measurement bias) can vary across wireless terminals of the same model. The drift can also be attributed to temperature and/or humidity considerations in the operating environment of the chip.

The present invention enables both the pressure measurement bias of and the drift of a barometric sensor in a wireless terminal to be identified and compensated for, resulting in calibrated pressure measurements and an improved estimate of elevation of the wireless terminal. In accordance with the illustrative embodiment of the present invention, a location engine disclosed herein generates an estimate of the measurement bias based, in part, on inferring the above-ground height of the wireless terminal.

The location engine generates the estimate of bias of barometric pressure by comparing i) the barometric pressure measured by the wireless terminal while at that elevation (i.e., the measured pressure) and ii) the barometric pressure that corresponds to an estimated elevation of the wireless terminal when it made the barometric pressure measurement (i.e., the expected pressure). In accordance with the illustrative embodiment, the estimated elevation is based on i) an inferred above-ground height and ii) the local terrain elevation, and the expected pressure is based, in part, on i) the measurement of barometric pressure at the pressure reference and ii) the estimated elevation.

Multiple techniques for inferring the above-ground height are disclosed herein. In a first technique for inferring the height, the location engine receives an estimate of movement of the wireless terminal, such as the speed of the wireless terminal. The estimate of movement is probative of whether the wireless terminal is in a vehicle or with a pedestrian, for example, and a corresponding height is inferred. In a second technique for inferring the height, the location engine receives the identity of a base station in communication with the wireless terminal, such as the service set identifier (SSID) or the media access control (MAC) address of a WiFi access point, and signal strength information. The base station identity and the received signal strength are probative of building floor, for example, and a corresponding height is inferred.

Subsequently, the location engine receives i) location-dependent information conveyed by a radio signal exchanged between a base station and the wireless terminal, and also ii) another measurement of barometric pressure at the wireless terminal. The location engine generates an estimate of a lateral location of the wireless terminal based on the location-dependent information conveyed by the radio signal exchanged between the base station and the wireless terminal. The location engine then generates an estimate of the elevation of the wireless terminal based on (i) a measurement of barometric pressure from a pressure reference corresponding to the lateral location of the wireless terminal, (ii) the measurement of barometric pressure at the wireless terminal corresponding to the lateral location, and (iii) the estimate of bias previously generated. In particular, the measurement of barometric pressure is adjusted by the estimate of bias, thereby resulting in a calibrated measurement.

In order to account for pressure measurement drift, the location engine can adjust the measurement of barometric pressure received from the wireless terminal by accounting for more than one estimate of bias, stored as a series. At least some of the estimates of bias in the series can be averaged or otherwise combined in some way, resulting in a value that is used to adjust the pressure measurement from the wireless terminal. For example and without limitation, the estimates of bias in the series can be weighted according to their relative ages in the series, prior to being used in the adjustment.

For at least some of the techniques disclosed herein, the calibration of pressure measurements and the subsequent use of calibrated pressure measurements are based on the inventors recognizing that while the pressure measurement of a wireless terminal is typically biased in an absolute sense, the wireless terminal can measure changes in pressure accurately. Indeed, the accuracy of a barometer-measured relative elevation change is typically in the range of a few centimeters after filtering out noise. An implication of this is that an estimated bias of barometric pressure, once it has been generated based on a pressure measurement at a first elevation, is applicable to adjusting the wireless terminal's pressure measurement at any elevation, and consequently can be used to provide an accurate estimate of elevation.

An illustrative method of estimating the elevation of a wireless terminal comprises: receiving, by a data-processing system, an estimate of movement of the wireless terminal; receiving, by the data processing system, a first measurement of barometric pressure at the wireless terminal; generating a first estimate of bias of barometric pressure measured by the wireless terminal based on: (i) the estimate of movement of the wireless terminal, and (ii) the first measurement of barometric pressure at the wireless terminal; receiving, by the data processing system, location-dependent information conveyed by a radio signal exchanged between a base station and the wireless terminal; receiving, by the data processing system, a second measurement of barometric pressure at the wireless terminal; generating an estimate of a lateral location of the wireless terminal based on the location-dependent information conveyed by the radio signal exchanged between the base station and the wireless terminal; and generating an estimate of the elevation of the wireless terminal based on: (i) the estimate of the lateral location of the wireless terminal, (ii) the second measurement of barometric pressure at the wireless terminal, and (iii) the first estimate of bias.

Another illustrative method of estimating the elevation of a first wireless terminal comprises: receiving, by a data-processing system, the identity of a first base station in communication with the first wireless terminal; receiving, by the data processing system, a first measurement of barometric pressure at the first wireless terminal; generating a first estimate of bias of barometric pressure measured by the first wireless terminal based on: (i) the identity of the first base station in communication with the first wireless terminal, and (ii) the first measurement of barometric pressure at the first wireless terminal; receiving, by the data processing system, location-dependent information conveyed by a first radio signal exchanged between a second base station and the first wireless terminal; receiving, by the data processing system, a second measurement of barometric pressure at the first wireless terminal; generating an estimate of a lateral location of the first wireless terminal based on the location-dependent information conveyed by the first radio signal exchanged between the second base station and the first wireless terminal; and generating an estimate of the elevation of the first wireless terminal based on: (i) the estimate of the lateral location of the first wireless terminal, (ii) the second measurement of barometric pressure at the first wireless terminal, and (iii) the first estimate of bias.

Yet another illustrative method of estimating the elevation of a first wireless terminal comprises: receiving, by a data-processing system, the identity of a first base station in communication with both the first wireless terminal and a second wireless terminal; receiving, by the data processing system, a first measurement of barometric pressure at the first wireless terminal; receiving, by the data processing system, a first measurement of barometric pressure at a second wireless terminal with which the first base station is also in communication; generating a first estimate of bias of barometric pressure measured by the first wireless terminal based on: (i) the first measurement of barometric pressure at the first wireless terminal, (ii) the first measurement of barometric pressure at the second wireless terminal, and (iii) a second estimate of bias of barometric pressure measured by the second wireless terminal; receiving, by the data processing system, location-dependent information conveyed by a first radio signal exchanged between a second base station and the first wireless terminal; receiving, by the data processing system, a second measurement of barometric pressure at the first wireless terminal; generating an estimate of a lateral location of the first wireless terminal based on the location-dependent information conveyed by the first radio signal exchanged between the second base station and the first wireless terminal; and generating an estimate of the elevation of the first wireless terminal based on: (i) the estimate of the lateral location of the first wireless terminal, (ii) the second measurement of barometric pressure at the first wireless terminal, and (iii) the first estimate of bias.

DEFINITIONS

Figure 1:
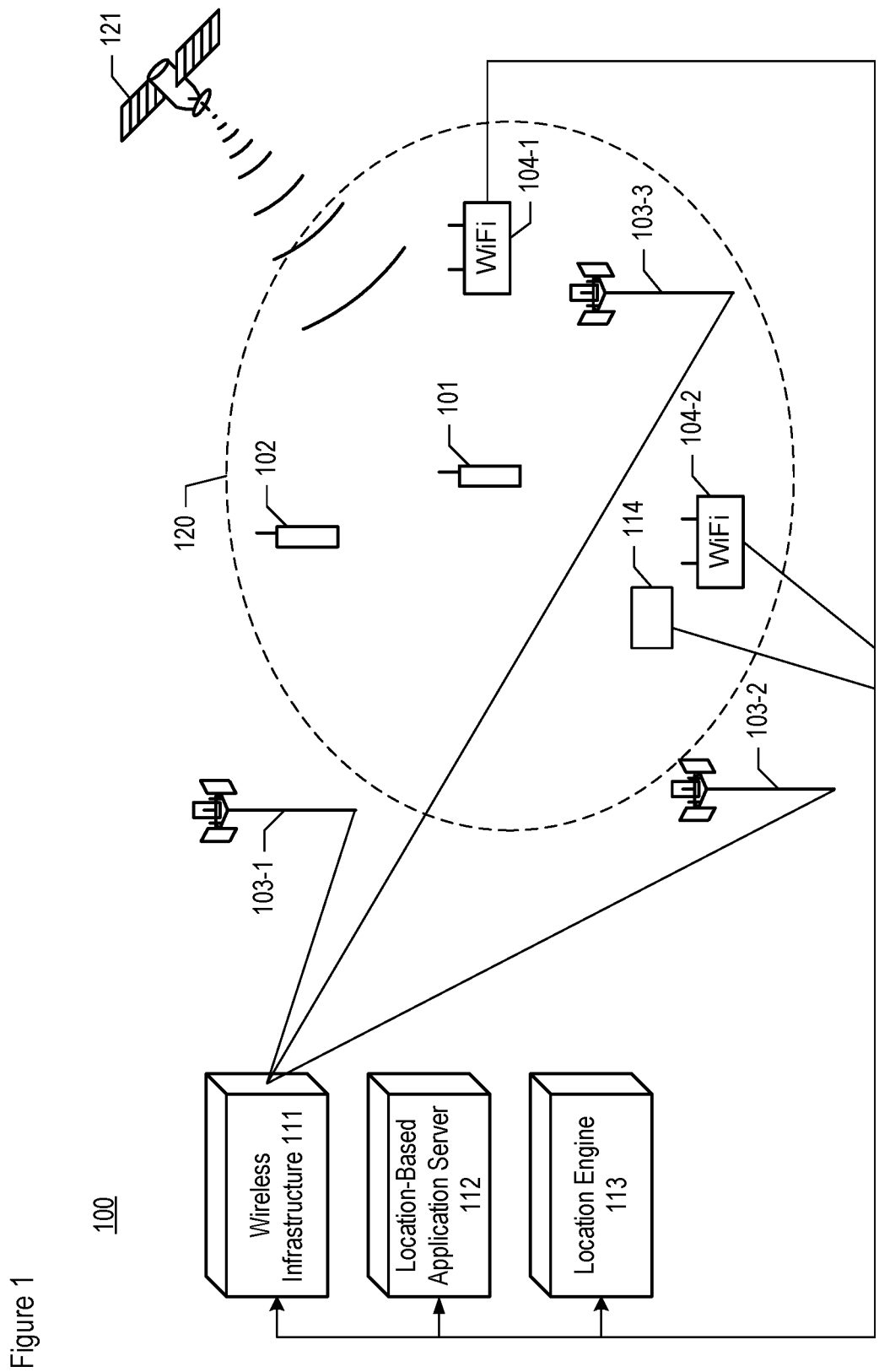
FIG. 1 depicts a diagram of the salient components of wireless telecommunications system 100 in accordance with the illustrative embodiment of the present invention.

Barometric Pressure—For the purposes of this specification, the term "barometric pressure" is defined as a pressure measured by a barometer. This pressure relates to atmospheric pressure, which is the force per unit area exerted on a surface by the weight of the air above that surface in the atmosphere of Earth.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Bias—For the purposes of this specification, the term "bias" is defined as a systematic distortion of a statistical result (e.g., a measurement, etc,) due to a factor not allowed for in its derivation.

Elevation—For the purposes of this specification, the term "elevation" is defined as the height relative to a reference (e.g., mean sea level, ground level, etc.).

Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

Height—For the purposes of this specification, the term "height" should be given the ordinary and customary meaning that the term would have to a person of ordinary skill in the art at the time of the invention.

Identity of a Radio Signal—For the purposes of this specification, the phrase "identity of a radio signal" is defined as one or more indicia that distinguish one radio signal from another radio signal.

Lateral Location—For the purposes of this specification, a "lateral location" is defined as information that is probative of latitude or longitude or latitude and longitude.

Location—For the purposes of this specification, the term "location" is defined as a zero-dimensional point, a finite one-dimensional path segment, a finite two-dimensional surface area, or a finite three-dimensional volume.

Location-Dependent Information—For the purposes of this specification, the term "location-dependent information" is defined as information that varies with location. For example and without limitation, For example and without limitation, location-dependent information can be:
  (i) a measurement of a location-dependent trait (e.g., signal strength, etc.) of a radio signal as received by the wireless terminal,
  (ii) the identity of a radio signal as received by the wireless terminal (e.g., in a service environment in which different radio signals transmitted from different locations are assigned different identities, etc.), or
  (iii) the identity (e.g., service set identifier [SSID], media access control [MAC] address, etc.) of the base station in communication with the wireless terminal (e.g., in a service environment in which different base stations at different locations are assigned different identities, etc.).

Location-Dependent Trait of a Radio Signal—For the purposes of this specification, the term "location-dependent trait of a radio signal" is defined as a characteristic of a radio signal that varies with:
  (i) the location of the transmitter of the signal, or
  (ii) the location of the receiver of the signal, or
  (iii) both i and ii.
For example and without limitation, the amplitude and phase of a radio signal are generally location-dependent traits of the signal. In contrast, the frequency of a given radio signal is generally not a location-dependent trait of the signal.

Location-Trait Database—For the purposes of this specification, a "Location-Trait Database" is defined as a mapping that associates:
  (i) one or more location-dependent traits of one or more radio signals received or transmitted by a wireless terminal, or
  (ii) the identity of one or more radio signals received or transmitted by a wireless terminal, or
  (iii) both i and ii,
at each of a plurality of locations.

Processor—For the purposes of this specification, a "processor" is defined as hardware or hardware and software that performs mathematical and/or logical operations.

Radio—For the purposes of this specification, a "radio" is defined as hardware or hardware and software that is capable of telecommunications via an unguided (i.e., wireless) radio signal of frequency less than 600 GHz.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Wireless terminal—For the purposes of this specification, the term "wireless terminal" is defined as a device that is capable of telecommunications without a wire or tangible medium. A wireless terminal can be mobile or immobile. A wireless terminal can transmit or receive or transmit and receive. As is well known to those skilled in the art, a wireless terminal is also commonly called a cell phone, a pager, a wireless transmit/receive unit (WTRU), a user equipment (UE), a mobile station, wireless handset, a fixed or mobile subscriber unit, a pager, a cellular telephone, a personal digital assistant (PDA), an Internet of Things (IoT) device, a computer, and any other type of device capable of operating in a wireless environment are examples of wireless terminals.

DETAILED DESCRIPTION

Wireless Telecommunications System 100

FIG. 1 depicts a diagram of the salient components of wireless telecommunications system 100 in accordance with the illustrative embodiment of the present invention. Wireless telecommunications system 100 comprises: wireless terminals 101 and 102, cellular base stations 103-1, 103-2, and 103-3, Wi-Fi base stations 104-1 and 104-2, wireless infrastructure 111, location-based application server 112, location engine 113, pressure reference 114, and Global Positioning System (GPS) constellation 121, interrelated as shown.

Wireless infrastructure 111, location-based application server 112, location engine 113 (hereinafter "location engine 113"), and Wi-Fi base stations 104-1 and 104-2 are all connected to one or more interconnected computer networks (e.g., the Internet, a local-area network, a wide-area network, etc.) and, as such, can exchange data in well-known fashion.

Wireless terminals 101 and 102 are devices that provide bi-directional voice, data, and video telecommunications services to their respective users (not shown). Terminals 101 and 102 also perform the processes described below and in the accompanying figures, including measuring barometric pressure and providing pressure measurements. Terminals 101 and 102 comprise the hardware and software necessary to do the aforementioned tasks. Furthermore, wireless terminals 101 and 102 are mobile and can be at any location within geographic region 120 at any time.

Wireless terminals 101 and 102 provide the aforementioned telecommunications services to their respective users and perform the aforementioned tasks. It will, however, be clear to those skilled in the art, after reading this disclosure, how to make and use embodiments of the present invention in which wireless terminals 101 and 102 provide a different set of services or perform a different set of tasks.

In accordance with the illustrative embodiment, wireless terminals 101 and 102 can receive one or more radio signals from each of base stations 103-1, 103-2, and 103-3, Wi-Fi base stations 104-1 and 104-2, and GPS constellation 121, in well-known fashion. Wireless terminals 101 and 102 are also capable of identifying each radio signal it receives, in well-known fashion, and of transmitting the identity of each signal it receives to location engine 113. Both wireless terminals are further capable of measuring one or more location-dependent traits of each radio signal they receive, in well-known fashion, and of transmitting each measurement they generate to location engine 113. And both wireless terminals also can measure a difference of a location-dependent trait of two signals they each receive, in well-known fashion, and of transmitting such measurements to location engine 113. As those who are skilled in the art will appreciate after reading this specification, wireless terminals 101 and 102 can use technologies other than WiFi and GPS for location purposes in some other embodiments of the present invention.

In accordance with the illustrative embodiment, wireless terminals 101 and 102 can transmit one or more radio signals—that can be received by one or more of base stations 103-1, 103-2, and 103-3 and Wi-Fi base stations 104-1 and 104-2—in accordance with specific parameters (e.g., signal strength, frequency, coding, modulation, etc.), in well-known fashion, and of transmitting those parameters to location engine 113.

In accordance with the illustrative embodiment, and as described in detail below, wireless terminals 101 and 102 each comprise a barometer (shown in FIG. 2 as barometer 205). Accordingly, wireless terminals 101 and 102 are capable of measuring (e.g., periodically, sporadically, and on-demand) the barometric pressure, in well-known fashion, and of transmitting the measurements to location engine 113.

Although the illustrative embodiment depicts wireless telecommunications system 100 as comprising two wireless terminals, it will be clear to those skilled in the art, after reading this disclosure, how to make and use alternative embodiments of the present invention that comprise any number of wireless terminals.

Cellular base stations 103-1, 103-2, and 103-3 communicate with wireless infrastructure 111 via wireline and with wireless terminals 101 and 102 via radio in well-known fashion. As is well known to those skilled in the art, base stations are also commonly referred to by a variety of alternative names such as access points, nodes, network interfaces, etc. Although the illustrative embodiment comprises three cellular base stations, it will be clear to those skilled in the art, after reading this disclosure, how to make and use alternative embodiments of the present invention that comprise any number of cellular base stations.

In accordance with the illustrative embodiment of the present invention, cellular base stations 103-1, 103-2, and 103-3 are terrestrial and immobile, and base station 103-3 is situated within geographic region 120. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 120.

Cellular base stations 103-1, 103-2, and 103-3 comprise the hardware and software necessary to be Long-Term Evolution (LTE) 3GPP-compliant and to perform the processes described below and in the accompanying figures. In some alternative embodiments of the present invention, base stations 103-1, 103-2, and 103-3 communicate in accordance with a different cellular standard. Each of cellular base stations 103-1, 103-2, and 103-3 are capable of continually, for example and without limitation:

a. receiving one or more radio signals transmitted by wireless terminals 101 and 102, and
 b. identifying each radio signal transmitted by wireless terminals 101 and 102, in well-known fashion, and of transmitting the identity of those signals to location engine 113, and
 c. measuring one or more location-dependent traits of each radio signal transmitted by wireless terminals 101 and 102, in well-known fashion, and of transmitting the measurements to location engine 113, and
 d. transmitting one or more signals to wireless terminals 101 and 102 in accordance with specific parameters (e.g., signal strength, frequency, coding, modulation, etc.), in well-known fashion, and of transmitting those parameters to location engine 113, and
 e. broadcasting one or more signals that wireless terminals can use for various purposes (e.g., mobile assisted handoff, location determination, etc.).

It will be clear to those skilled in the art how to make and use cellular base stations 103-1, 103-2, and 103-3.

Wi-Fi base stations 104-1 and 104-2 communicate with wireless terminals 101 and 102 via radio in well-known fashion and in accordance with a WiFi protocol. In some alternative embodiments of the present invention, base stations 104-1 and 104-2 communicate in accordance with a different IEEE 802.11 standard or wireless LAN standard entirely. Wi-Fi base stations 104-1 and 104-2 are terrestrial, immobile, and within geographic region 120. Although the illustrative embodiment comprises two Wi-Fi base stations, it will be clear to those skilled in the art, after reading this disclosure, how to make and use alternative embodiments of the present invention that comprise any number of Wi-Fi base stations.

Each of Wi-Fi base stations 104-1 and 104-2 are capable of continually:

a. receiving one or more radio signals transmitted by wireless terminals 101 and 102, and
 b. identifying each radio signal transmitted by wireless terminals 101 and 102, in well-known fashion, and of transmitting the identity of those signals to location engine 113, and
 c. measuring one or more location-dependent traits of each radio signal transmitted by wireless terminals 101 and 102, in well-known fashion, and of transmitting the measurements to location engine 113, and
 f. transmitting one or more signals to wireless terminals 101 and 102 in accordance with specific parameters (e.g., signal strength, frequency, coding, modulation, etc.), in well-known fashion, and of transmitting those parameters to location engine 113, and
 g. broadcasting one or more signals that wireless terminals can use for various purposes (e.g., mobile assisted handoff, location determination, etc.).

It will be clear to those skilled in the art how to make and use Wi-Fi base stations 104-1 and 104-2.

Wireless infrastructure 111 comprises a switch that orchestrates the provisioning of telecommunications service to wireless terminals 101 and 102 and the flow of information to and from location engine 113, as described below and in the accompanying figures. As is well known to those skilled in the art, wireless switches are also commonly referred to by other names such as mobile switching centers, mobile telephone switching offices, routers, and so on.

Location-based application server 112 comprises hardware and software that uses the estimate of the location of wireless terminals 101 and 102—generated by location engine 113—in a location-based application, in well-known fashion. Location-based applications are well-known in the art and provide services such as without limitation E-911 routing, navigation, location-based advertising, weather alerts. In accordance with the illustrative embodiment, location-based application server 112 is implemented on a data-processing system made up of one or more server computers.

Figure 3:
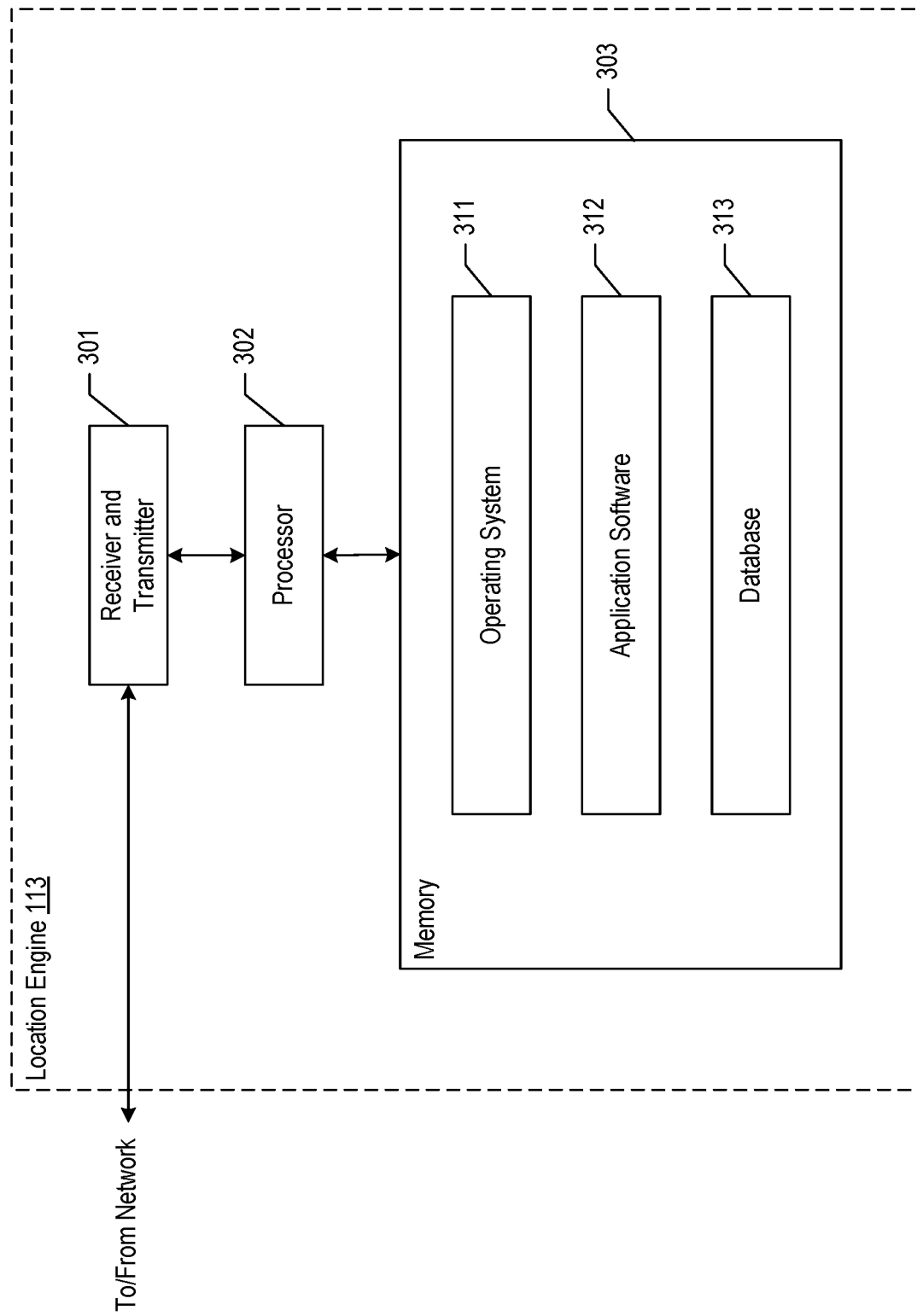
FIG. 3 depicts a block diagram of the salient components of location engine 113 of telecommunications system 100.

Location engine 113 is a data processing system that comprises hardware and software that generates one or more estimates of the locations of wireless terminals 101 and 102 as described below and in the accompanying figures. In accordance with the illustrative embodiment, location engine 113 is implemented on a data-processing system made up of one or more server computers. It will be clear to those skilled in the art, after reading this disclosure, how to make and use location engine 113. Furthermore, although location engine 113 is depicted in FIG. 3 as physically distinct from wireless infrastructure 111, it will be clear to those skilled in the art, after reading this disclosure, how to make and use alternative embodiments of the present invention in which location engine 113 is wholly or partially integrated into wireless infrastructure 111. Location engine 113 comprises the location-trait database and geographic information system (GIS) databases, which are described in detail below.

Pressure reference 114 comprises hardware and software that continually measures the atmospheric pressure (i.e., provides a measurement of barometric pressure at an outdoor location), in well-known fashion, and transmits those measurements to location engine 113. Pressure reference 114 is at a known location in geographic region and known elevation, and measures barometric pressure at an outdoor location, thereby not being subject to any stack effect. In some embodiments of the present invention, pressure reference 114 is at a weather-reporting station, while in other embodiments reference 114 is at an airport station, while in still other embodiments reference 114 is at a different type of station (i.e., neither at an airport nor reporting the weather). Although the illustrative embodiment comprises only one pressure reference, it will be clear to those skilled in the art how to make and use alternative embodiments of the present invention that comprise any number of pressure references.

Wireless Terminal 101—

Figure 2:
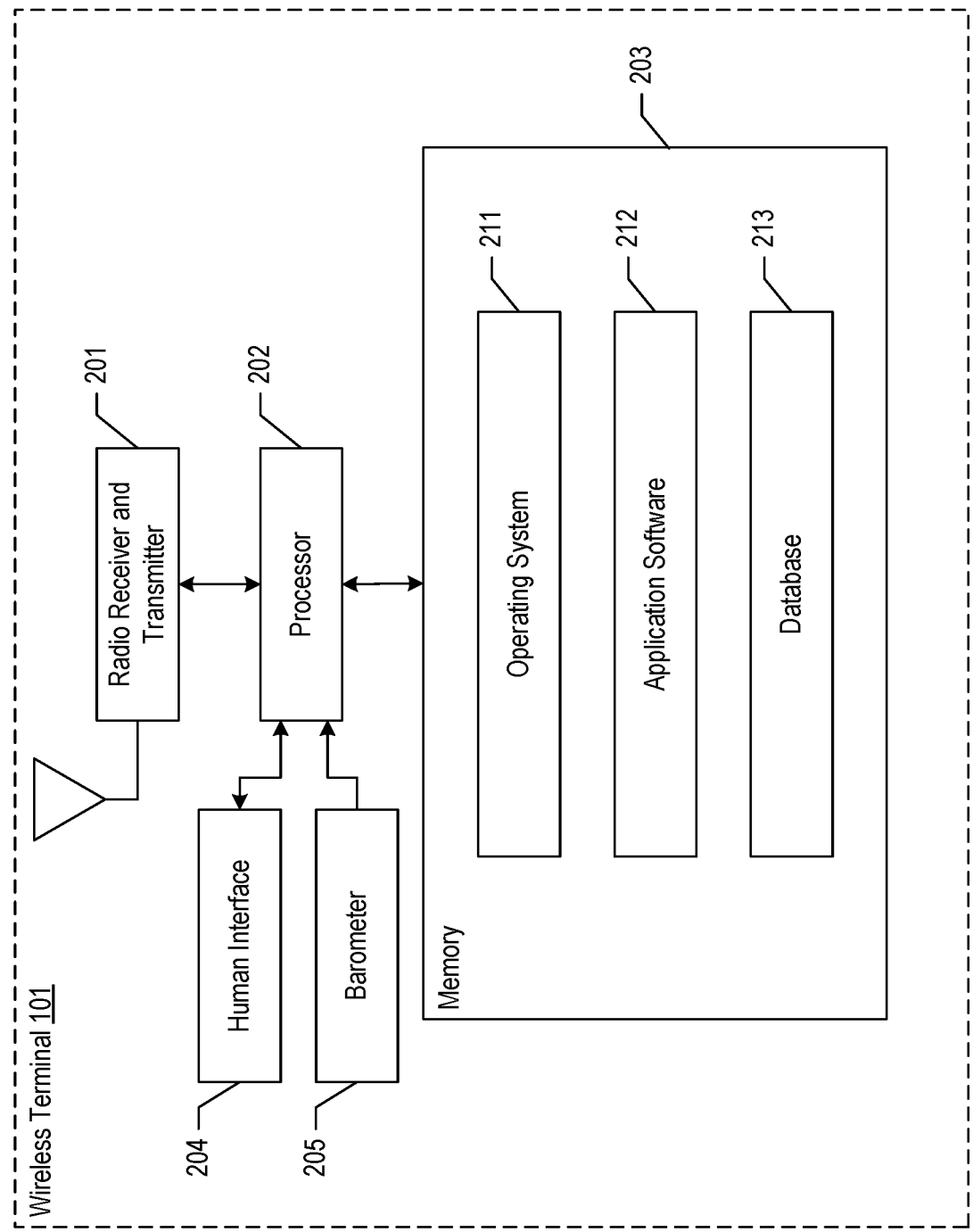
FIG. 2 depicts a block diagram of the salient components of wireless terminal 101 of telecommunications system 100.

FIG. 2 depicts a block diagram of the salient components of wireless terminal 101 in accordance with the illustrative embodiment of the present invention. Wireless terminal 101 comprises: radio receiver and transmitter 201, processor 202, memory 203, human interface 204, and barometer 205, interconnected as shown. The block diagram depicted in FIG. 2 can also be considered representative of wireless terminal 102 and other wireless terminals.

Radio receiver and transmitter 201 comprises hardware and software that enables wireless terminal 101 to receive (and analyze) radio signals and to transmit radio signals. In accordance with the illustrative embodiment, wireless telecommunications service is provided to wireless terminal 101 in accordance with both the Long-Term Evolution (LTE) 4G air-interface standard of the 3$^{rd}$ Generation Partnership Project ("3GPP") and the WiFi standard. After reading this disclosure, however, it will be clear to those skilled in the art how to make and use alternative embodiments of the present invention that operate in accordance with one or more other air-interface standards (e.g., a 5G or other standard under development, a different 4G standard, Global System Mobile "GSM," UMTS, CDMA-2000, IS-136 TDMA, IS-95 CDMA, 3G Wideband CDMA, other IEEE 802.11 or wireless LAN standard, 802.16 WiMax, Bluetooth, etc.) in one or more frequency bands. It will be clear to those skilled in the art how to make and use radio receiver and transmitter 201.

Processor 202 is hardware under the command of software stored in memory 203 that performs all of the relevant functions described below and in the accompanying figures. It will be clear to those skilled in the art how to make and use processor 202.

Memory 203 is a non-transitory, non-volatile random-access memory that holds all of the programming and data required for the operation of wireless terminal 101, and includes operating system 211, application software 212, and database 213. It will be clear to those skilled in the art how to make and use memory 203.

Human interface 204 is hardware and software that enables a person to interact with wireless terminal 101. Human interface 204 comprises a display, keypad, microphone, and speaker. It will be clear to those skilled in the art how to make and use human interface 204.

Barometer 205 is a barometric sensor device and comprises a hardware MEMS sensor that measures the atmospheric pressure at wireless terminal 101, thereby providing barometric pressure measurements. In accordance with the illustrative embodiment, barometer 205 comprises the LSP 331 AP MEMS pressure sensor from ST Microelectronics and/or the Bosch BMP 280 sensor, but it will be clear those skilled in the art, after reading this disclosure, how to make and use alternative embodiments of the present invention that use a different sensor to measure the atmospheric pressure.

As those who are skilled in the art will appreciate, wireless terminal 101 can be equipped with one or more sensors that can measure temperature of and/or humidity in the environment. For example, the Bosch BMP 280 chip is also capable of measuring temperature.

Wireless terminal 101 can perform at least some of the processes described below and in the accompanying figures. For example and without limitation, wireless terminal 101 is capable of:
  a. receiving one or more radio signals transmitted by cellular base stations 103-1, 103-2, and 103-3, Wi-Fi base stations 104-1 and 104-2, and GPS constellation 121, and
  b. identifying each radio signal transmitted by cellular base stations 103-1, 103-2, and 103-3, Wi-Fi base stations 104-1 and 104-2, and GPS constellation 121, in well-known fashion, and of transmitting the identity of those signals to location engine 113, and
  c. measuring one or more location-dependent traits of each radio signal transmitted by cellular base stations 103-1, 103-2, and 103-3, Wi-Fi base stations 104-1 and 104-2, and GPS constellation 121, in well-known fashion, and of transmitting the measurements to location engine 113, and
  d. transmitting one or more signals to cellular base stations 103-1, 103-2, and 103-3, Wi-Fi base stations 104-1 and 104-2 in accordance with specific parameters (e.g., signal strength, frequency, coding, modulation, etc.), in well-known fashion, and of transmitting those parameters to location engine 113, and
  e. measuring the barometric pressure at wireless terminal 101, in well-known fashion, and transmitting those measurements to location engine 113. In some embodiments of the present invention, wireless terminal can measure the temperature and/or humidity at wireless terminal 101, in well-known fashion, and transmit those measurements to location engine 113.

It will be clear to those skilled in the art how to make and use wireless terminal 101 and, by extension, wireless terminal 102.

Location Engine 113—

FIG. 3 depicts a block diagram of the salient components of location engine 113 in accordance with the illustrative embodiment. Location engine 113 comprises: receiver and transmitter 301, processor 302, and memory 303, which are interconnected as shown.

Receiver and transmitter 301 enables location engine 113 to transmit to and receive from wireless terminals 101 and 102, wireless infrastructure 111, location-based application server 112, pressure reference 114, and Wi-Fi base stations 104-1 and 104-2, in well-known fashion. It will be clear to those skilled in the art how to make and use receiver and transmitter 301.

Processor 302 is a general-purpose processor that can execute an operating system, the application software that performs operations 403 through 413 (described herein and shown in FIG. 4), and of populating, amending, using, and managing a location-trait database and a GIS database, as described in detail below and in the accompanying figures. It will be clear to those skilled in the art how to make and use processor 302.

In general, the location-trait database contains information for the possible locations of a wireless terminal and the identity and location-dependent traits of radio signals as if the wireless terminal were at each of those locations. It will be clear to those skilled in the art how to make and use the location-trait database.

In general, the GIS database contains information for geographic region 120, including without limitation, the physical characteristics of all of the structures in geographic region 120. It will be clear to those skilled in the art how to make and use the GIS database.

Memory 303 is a non-transitory, non-volatile memory that stores:
  a. operating system 311, and
  b. application software 312, and
  c. the location-trait database in database 313, and
  d. the GIS database in database 313.
It will be clear to those skilled in the art how to make and use memory 303.

Operation of the Illustrative Embodiment—

Figure 4:
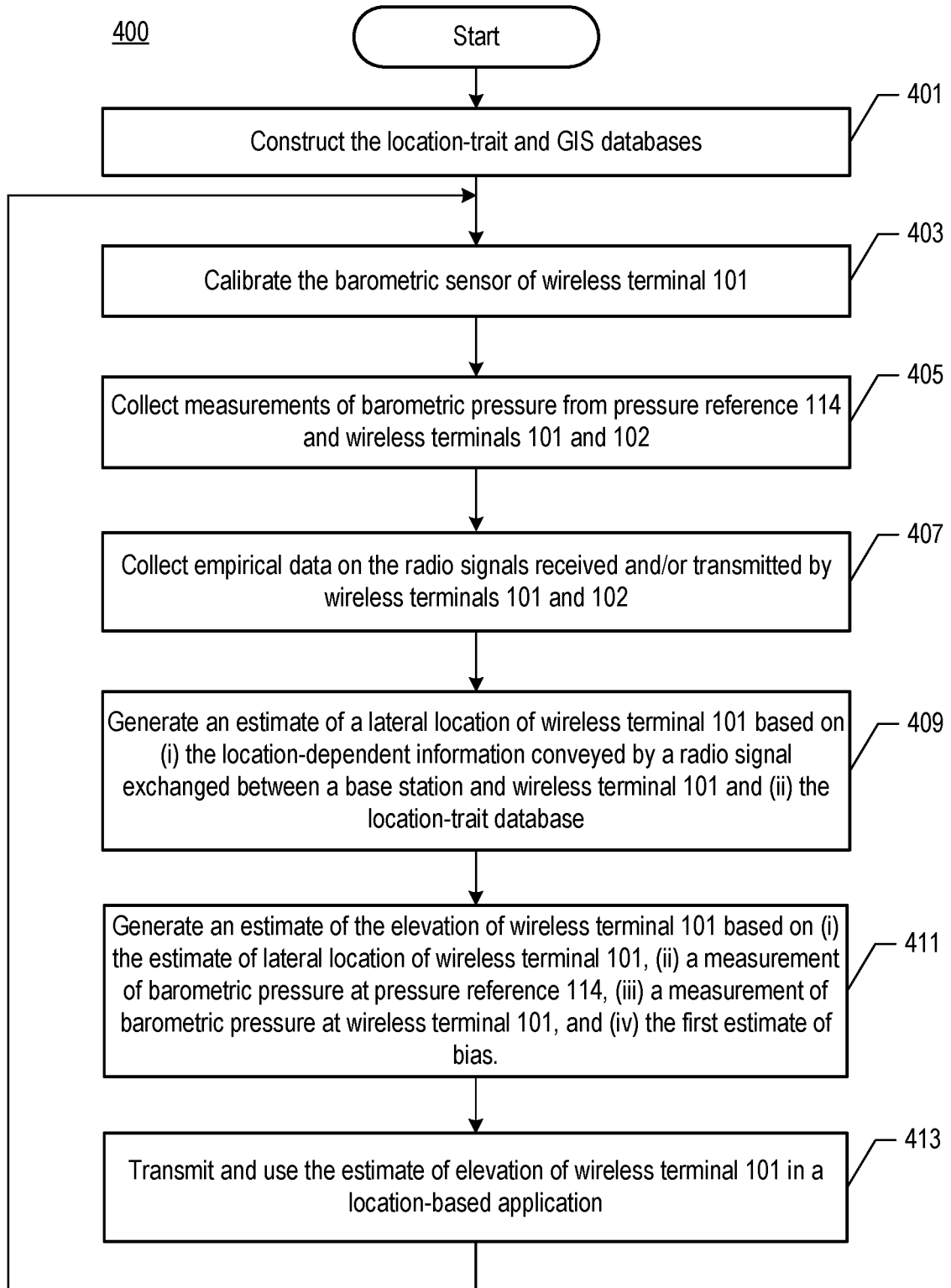
FIG. 4 depicts a flowchart of the salient processes performed as part of method 400 in accordance with the illustrative embodiment of the present invention.

FIG. 4 depicts a flowchart of the salient processes performed as part of method 400 in accordance with the illustrative embodiment of the present invention. It will be clear to those having ordinary skill in the art, after reading the present disclosure, how to make and use alternative embodiments of method 400, as well as the other methods disclosed in this specification, wherein the recited operations sub-operations, and messages are differently sequenced, grouped, or sub-divided—all within the scope of the present disclosure. It will also be clear to those skilled in the art, after reading the present disclosure, how to make and use alternative embodiments of the disclosed methods wherein some of the described operations, sub-operations, and messages are optional, or are omitted.

It will also be clear to those skilled in the art, after reading the present disclosure, how to make and use alternative embodiments of the disclosed methods wherein some of the disclosed operations are performed by other elements and/or systems. For example and without limitation, at least some of the operations disclosed as being performed by location engine 113 can be performed by one or more wireless terminals (e.g., terminal 101, terminal 102, etc.).

In accordance with operation 401, the location-trait database and the GIS database are constructed and stored in memory 303 of location engine 113. Operation 401 is described in detail below and in the accompanying figures.

In accordance with operation 403, location engine 113 calibrates barometer 205 of wireless terminal 101, including generating an estimate of bias of barometric pressure at wireless terminal 101. Operation 403 is described in detail below and in the accompanying figures.

In accordance with operation 405, location engine 113 collects measurements of barometric pressure from wireless terminals 101 and 102, and from pressure reference 114. In some embodiments of the present invention, location engine 113 can also collect measurements of temperature and/or humidity. Operation 405 is described in detail below and in the accompanying figures.

In accordance with operation 407, location engine 113 collects empirical data on the radio signals received and transmitted by wireless terminals 101 and 102. Operation 407 is described in detail below and in the accompanying figures.

Figure 8:
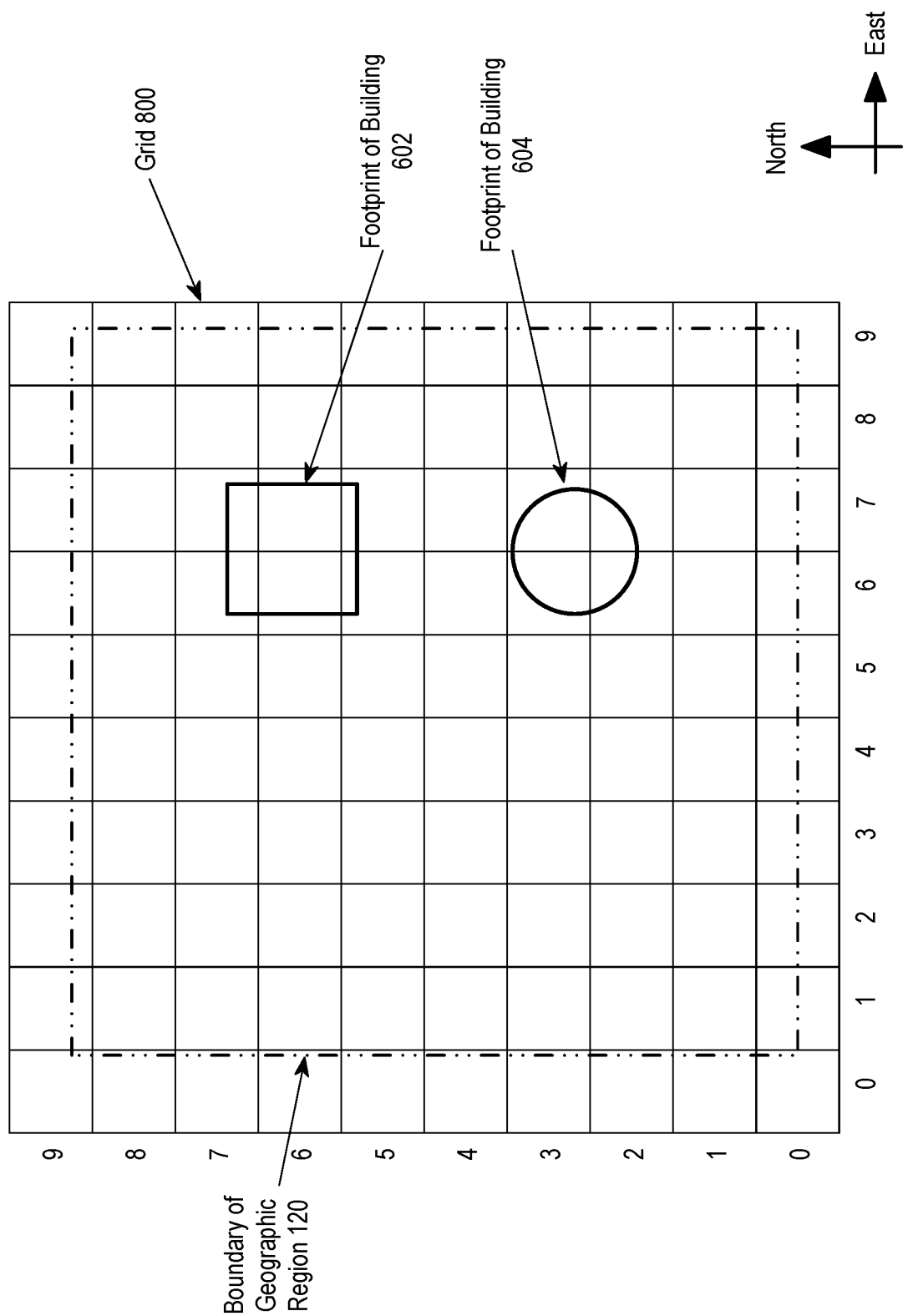
FIG. 8 depicts geographic region 120 divided into a 10-by-10 grid.

In accordance with operation 409, location engine 113 generates an estimate of the lateral location of wireless terminal 101 based on:
  (i) the location-dependent information conveyed by a radio signal exchanged between a base station (e.g., cellular base station 103-$i$, Wi-Fi base station 104-$j$, etc.) and wireless terminal 101 (e.g., the empirical data for the radio signals received in operation 407, etc.), and
  (ii) the location-trait database,
in well-known fashion. It will be clear to those skilled in the art how to make and use embodiments of the present invention to perform operation 409. See for example and without limitation, U.S. Pat. Nos. 6,944,465, 7460,505, 7,383,051, 7,257,414, 7,753,278, 7,433,695, 7,848,762, and 8,630,665, each of which are incorporated by reference. In accordance with the illustrative embodiment of the present invention, the estimate of the lateral location of wireless terminal 101 is one grid square in geographic region 120 (as depicted in FIG. 8).

As those who are skilled in the art will appreciate after reading this specification, in some alternative embodiments the lateral location can be determined using a different technique than RF pattern matching (e.g., Global Navigation Satellite System [GNSS], GPS, etc.) that is based on a measurement of a location-dependent trait of a radio signal and/or on the identity of a radio signal.

In accordance with operation 411, location engine 113 generates an estimate of the elevation of wireless terminal 101 based on:
  (i) the estimate of lateral location of wireless terminal 101 generated in accordance with operation 409,
  (ii) a measurement of barometric pressure at pressure reference 114 obtained in accordance with operation 405,
  (iii) a measurement of barometric pressure at wireless terminal 101 obtained in accordance with operation 405, and
  (iv) an estimate of bias obtained in accordance with operation 403. Operation 411 is described in detail below and in the accompanying figures.

In accordance with operation 413, location engine 113 transmits:
  (i) the estimate of the lateral location of wireless terminal 101 generated in accordance with operation 409, and/or
  (ii) the estimate of the elevation of wireless terminal 101 generated in accordance with operation 411,
to location-based application server 112 and/or to wireless terminal 101 and/or 102 for use in a location-based application. In some embodiments of the present invention, location engine 113 transmits the estimate of bias generated in accordance with operation 403. In some embodiments of the present invention, location engine 113 displays (e.g., on a display, etc.) the estimate of bias, estimate of lateral location and/or estimate of elevation, instead of or in addition to transmitting them. It will be clear to those skilled in the art how to make and use embodiments of the present invention that perform operation 413.

After operation 413 is completed, control passes back to operation 403.

Operation 401: Construct the GIS Database and the Location-Trait Database

Figure 5:
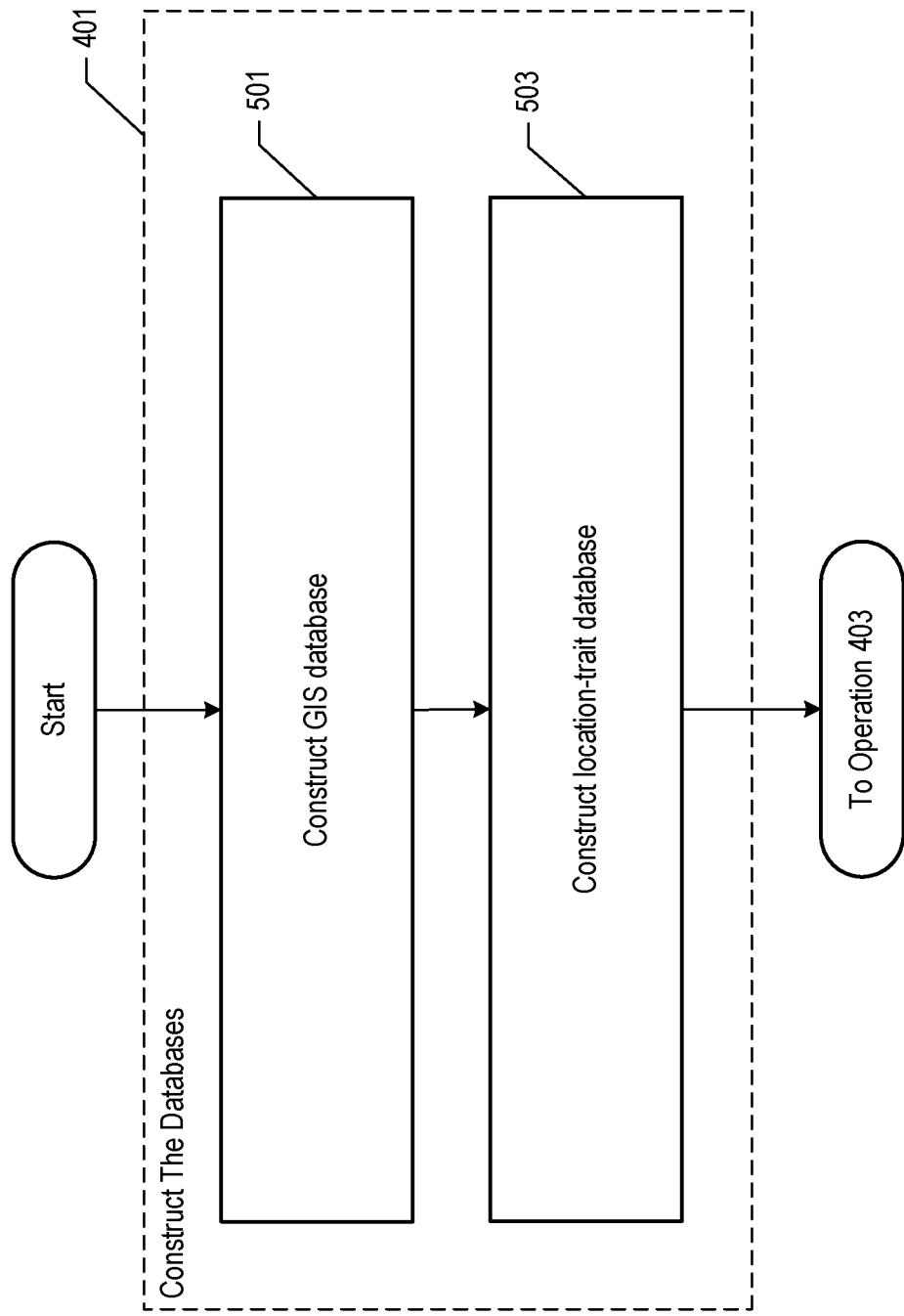
FIG. 5 depicts a flowchart of the salient processes performed in accordance with operation 401 of method 400.

FIG. 5 depicts a flowchart of the salient processes performed in accordance with operation 401.

At operation 501, the GIS database is constructed and stored in memory 303 of location engine 113.

Figure 6:
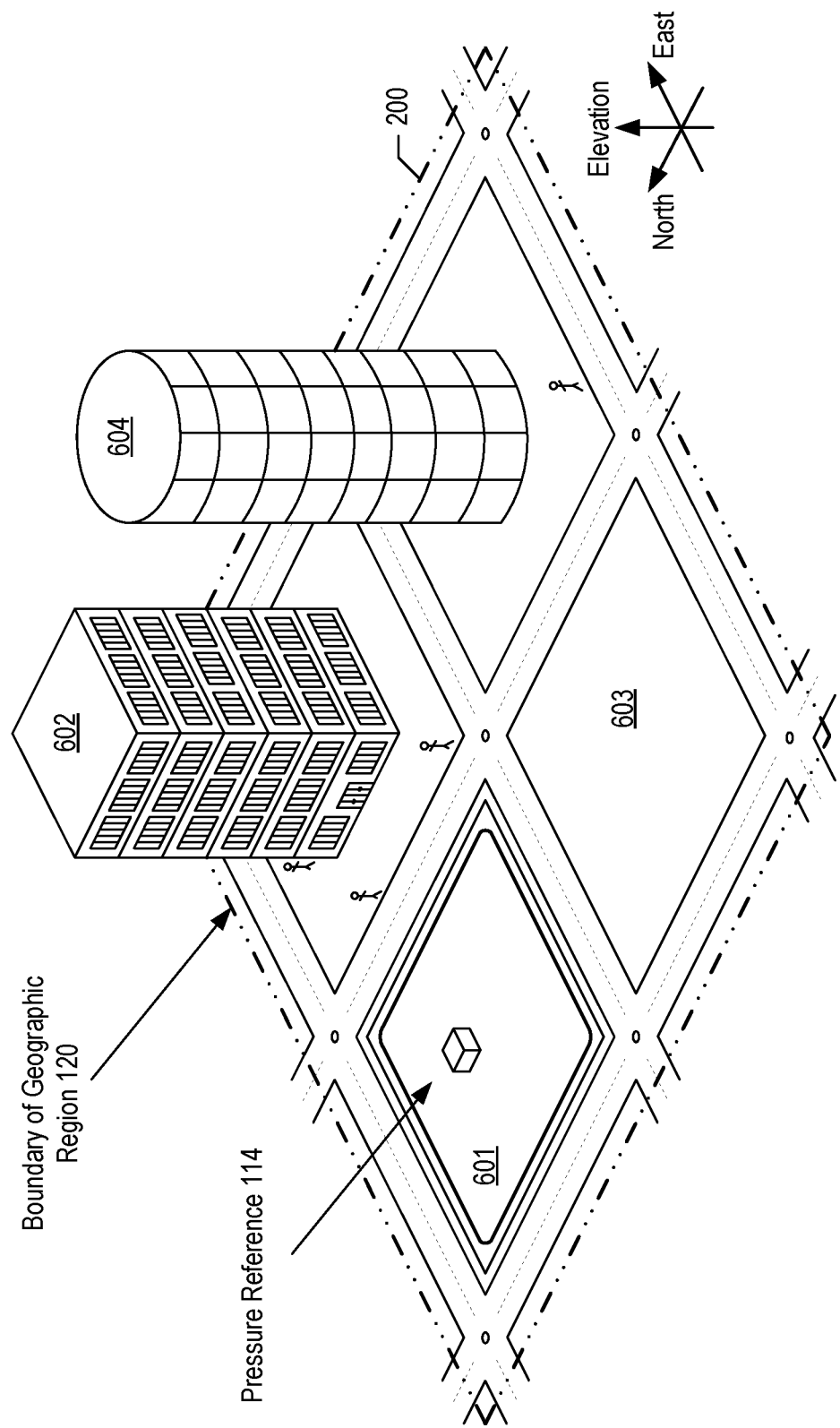
FIG. 6 depicts an isometric drawing of geographic region 120 in accordance with the illustrative embodiment of the present invention.

As part of operation 501, geographic region 120 is delimited and surveyed. FIG. 6 depicts a detailed map that is made of geographic region 120, which spans approximately four city blocks and comprises, among other things, park 601, boxy building 602, empty lot 603, cylindrical building 604, and pressure reference 114. It will be clear to those skilled in the art, after reading this disclosure, how to make and use alternative embodiments of the present invention that comprise any area, any geographic features, and any number, size, height, and shape of structures.

In accordance with the illustrative embodiment, geographic region 120 is flat, level, and at an elevation of 1000 meters, a known elevation. It will be clear to those skilled in the art, however, after reading this disclosure, how to make and use alternative embodiments of the present invention in which geographic region is not flat, not level, and/or is at a different elevation.

In accordance with the illustrative embodiment, the height of boxy building 602 is 128 meters and the height of cylindrical building 604 is 140 meters. In other words, the elevation of boxy building 602 is 1128 meters and the elevation of cylindrical building 604 is 1140 meters. It will be clear to those skilled in the art, after reading this disclosure, how to make and use alternative embodiments of the present invention in which the structures have any height.

Figure 7:
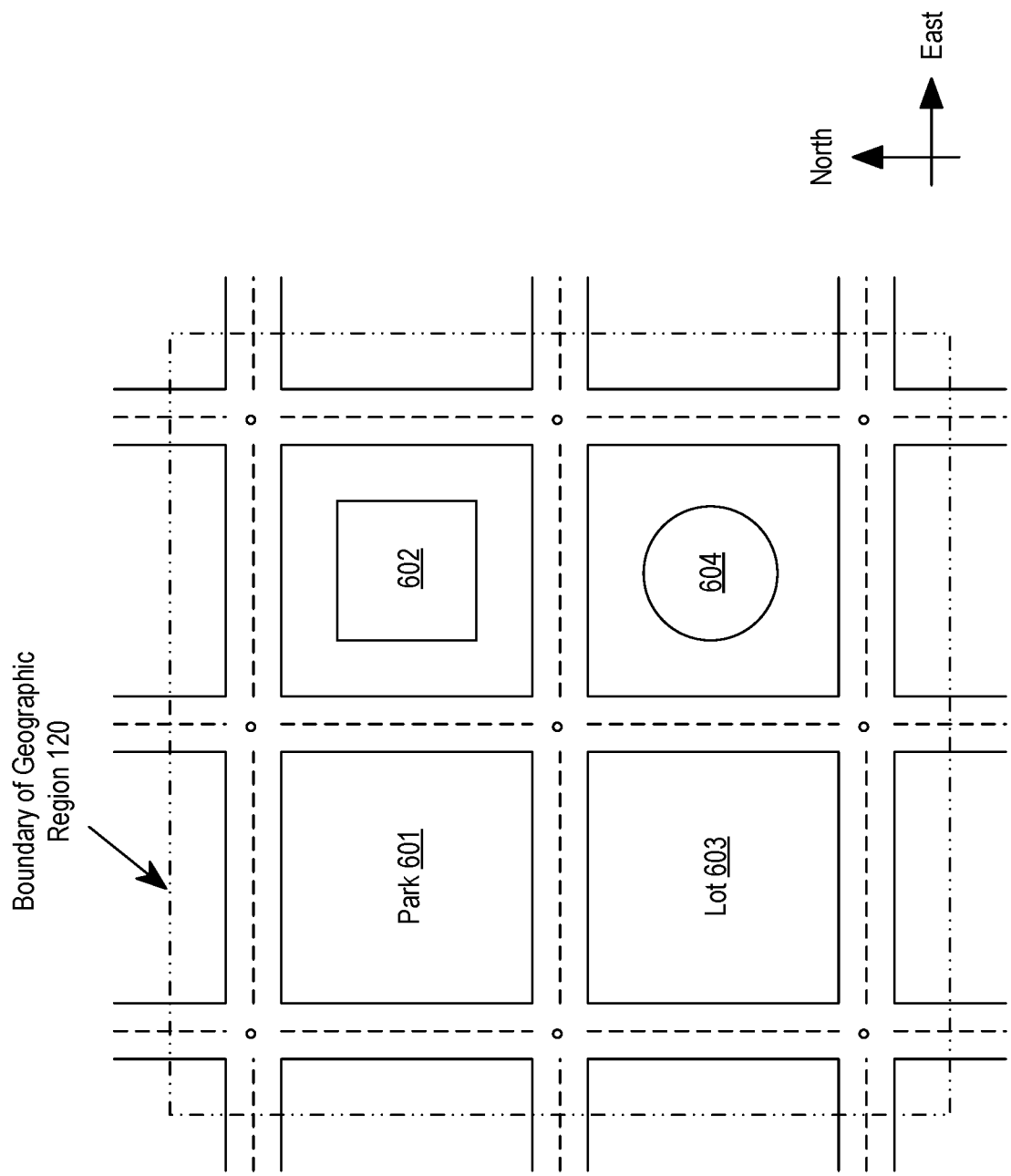
FIG. 7 a detailed map of the ground level of geographic region 120.

In accordance with the illustrative embodiment, geographic region 120 is square and comprises approximately four city blocks of an urban environment. It will be clear to those skilled in the art however, after reading this disclosure, how to make and use alternative embodiments of the present invention in which geographic region 120 has any area of any shape and any population density and development. As part of operation 501, a detailed map of the ground level of geographic region is made in well-known fashion, and as shown in FIG. 7.

As part of operation 501, grid 800 is overlaid onto geographic region 120 as shown in FIG. 8. Grid 800 is a 10-by-10 grid that partitions geographic region 120 into a plurality of possible lateral locations of wireless terminal 101. FIG. 8 also depicts the relationship of the footprints of boxy building 602 and cylindrical building 604 with respect to the grid.

Although the illustrative embodiment comprises 100 grid squares, it will be clear to those skilled in the art how to make and use alternative embodiments of the present invention that comprise any number of possible lateral locations with any shape. See for example and without limitation, U.S. Pat. No. 7,753,278, which is incorporated by reference.

At any instant, the three-dimensional location of wireless terminal 101 can be described by a combination of a lateral location and an elevation. Although it is not improbable for wireless terminal 101 to be at any lateral location in geographic region 120 and it is not improbable for wireless terminal 101 to be at any elevation (up to 1140 meters) above geographic region 120, it is improbable for wireless terminal 101 to be at some combinations of those lateral locations and elevations. For example, it is not improbable for wireless terminal 101 to be at a lateral location in park 601 and to have an elevation of 1001 meters (i.e., be at or near ground level). It is, however, improbable for wireless terminal 101 to be at a lateral location in park 601 and to have an elevation of 1060 meters.

Therefore, as part of operation 501, each improbable combination of lateral locations and elevations for wireless terminal 101 in geographic region is determined, indexed by elevation, and stored in the GIS database. Each improbable combination of lateral locations and elevation for wireless terminal 101 can be determined by referencing the three-dimensional survey of geographic region 120, which is depicted in FIG. 9.

Figure 9:
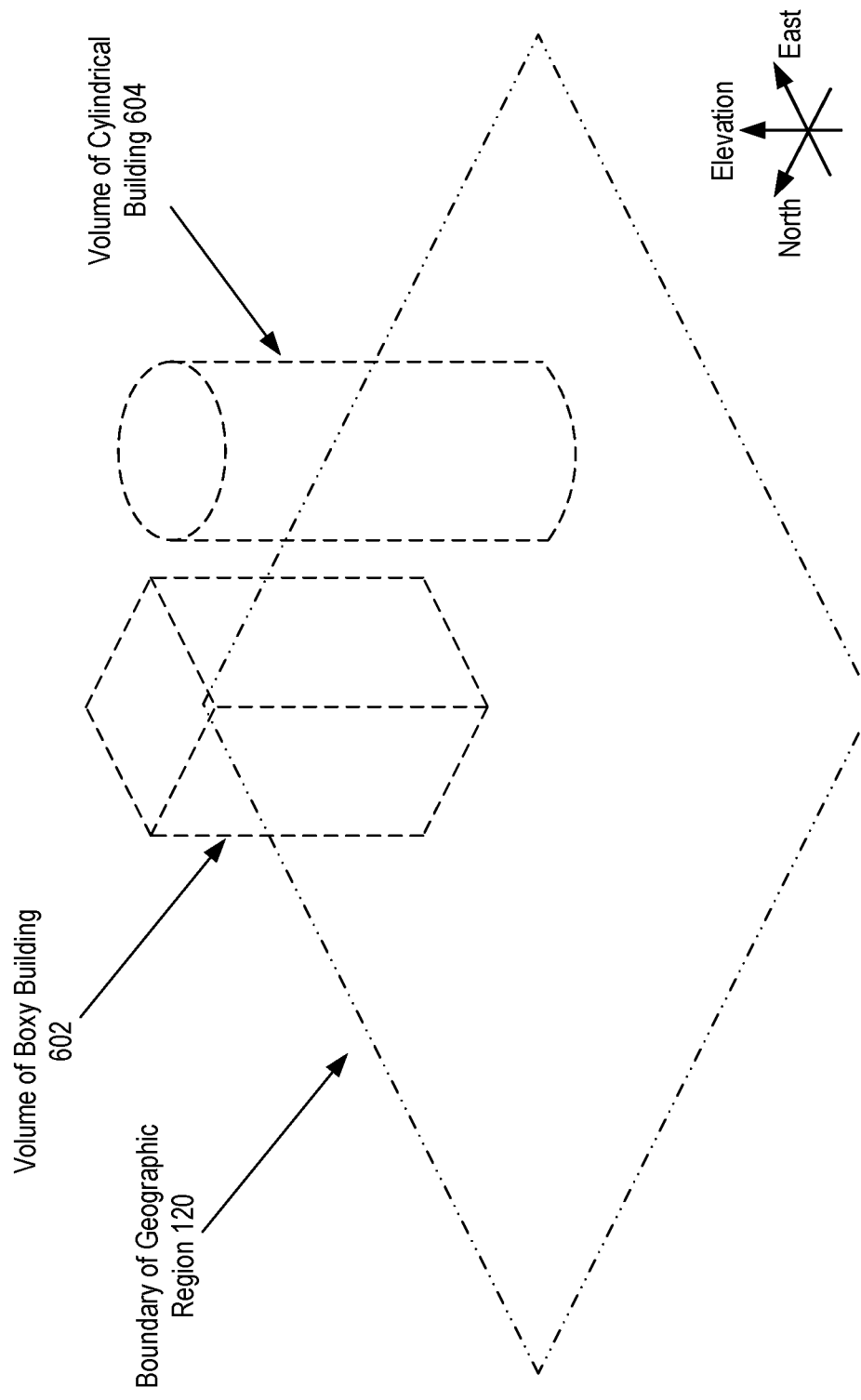
FIG. 9 depicts a three-dimensional survey of geographic region 120.

From the survey (as depicted in FIGS. 8 and 9), it can be seen that when wireless terminal 101 is at ground level (e.g., under an elevation of 1003 meters, etc.), it is not improbable for wireless terminal 101 to be at any lateral location in geographic region 120.

In contrast, when wireless terminal 101 is at an elevation above ground level (e.g., above an elevation of 1003 meters, etc.) and below the rooftop of building 602 (1128 meters), it is improbable for wireless terminal 101 to be at any lateral location that is outside of either boxy building 602 or cylindrical building 604, given the boundaries of the buildings. Therefore, when wireless terminal 101 is in this range of elevations, the plurality of lateral locations of wireless terminal 101 that are not improbable include the following coordinates referenced in FIG. 8: (6,2), (6,3), (6,5), (6,6), (6,7), (7,2), (7,3), (7,5), (7,6), and (7,7).

When wireless terminal 101 is at an elevation above the rooftop of building 602 (1128 meters) and below the rooftop of building 604 (1140 meters), it is improbable for wireless terminal 101 to be at any lateral location that is outside of cylindrical building 604. Therefore, when wireless terminal 101 is in this range of elevations, the plurality of lateral locations of wireless terminal 101 that are not improbable include: (6,5), (6,6), (6,7), (7,5), (7,6), and (7,7).

This information is stored in the GIS database in memory 303 as shown in Table 1.

TABLE 1

Possible Lateral Locations of Wireless Terminal 101 That Are Not Improbable Given The Elevation of Wireless Terminal 101

| Elevation of Wireless Terminal 101 | Possible Lateral Locations of Wireless Terminal 101 That Are Not Improbable |
|---|---|
| 1000 to 1003 meters | All 100 Grid Squares |
| 1003 to 1128 meters | (6, 2), (6, 3), (6, 5), (6, 6), (6, 7), (7, 2), (7, 3), (7, 5), (7, 6), (7, 7) |
| 1028 to 1140 meters | (6, 5), (6, 6), (6, 7), (7, 5), (7, 6), (7, 7) |

At operation 503, the location-trait database is constructed and stored into memory 303 of location engine 113. As part of operation 503, the identity—and location-dependent traits for—each radio signal that a wireless terminal (e.g., terminal 101, terminal 102, etc.) is expected to be able to receive from cellular base stations 103-1, 103-2, and 103-3, Wi-Fi base stations 104-1 and 104-2, for each possible lateral location of the wireless terminal, is determined in well-known fashion.

As part of operation 503, the identity of—and location-dependent traits for—each radio signal that each of cellular base stations 103-1, 103-2, and 103-3, Wi-Fi base stations 104-1 and 104-2 is expected to be able to receive from a wireless terminal, for each possible lateral location of the wireless terminal, is determined in well-known fashion.

It will be clear to those skilled in the art how to accomplish operation 503, and in accordance with the illustrative embodiment, this is accomplished through a combination of "drive testing" (i.e., empirical data gathering) and radio-frequency propagation modeling. See for example and without limitation, U.S. Patent Application Publications 2008/0077356, 2008/0077472, and 2008/0077516, which are incorporated by reference.

It will be clear to those skilled in the art that operations 501 and 503 can be performed concurrently or in any order.

Operation 403: Calibrate Barometric Sensor—

Figure 10:
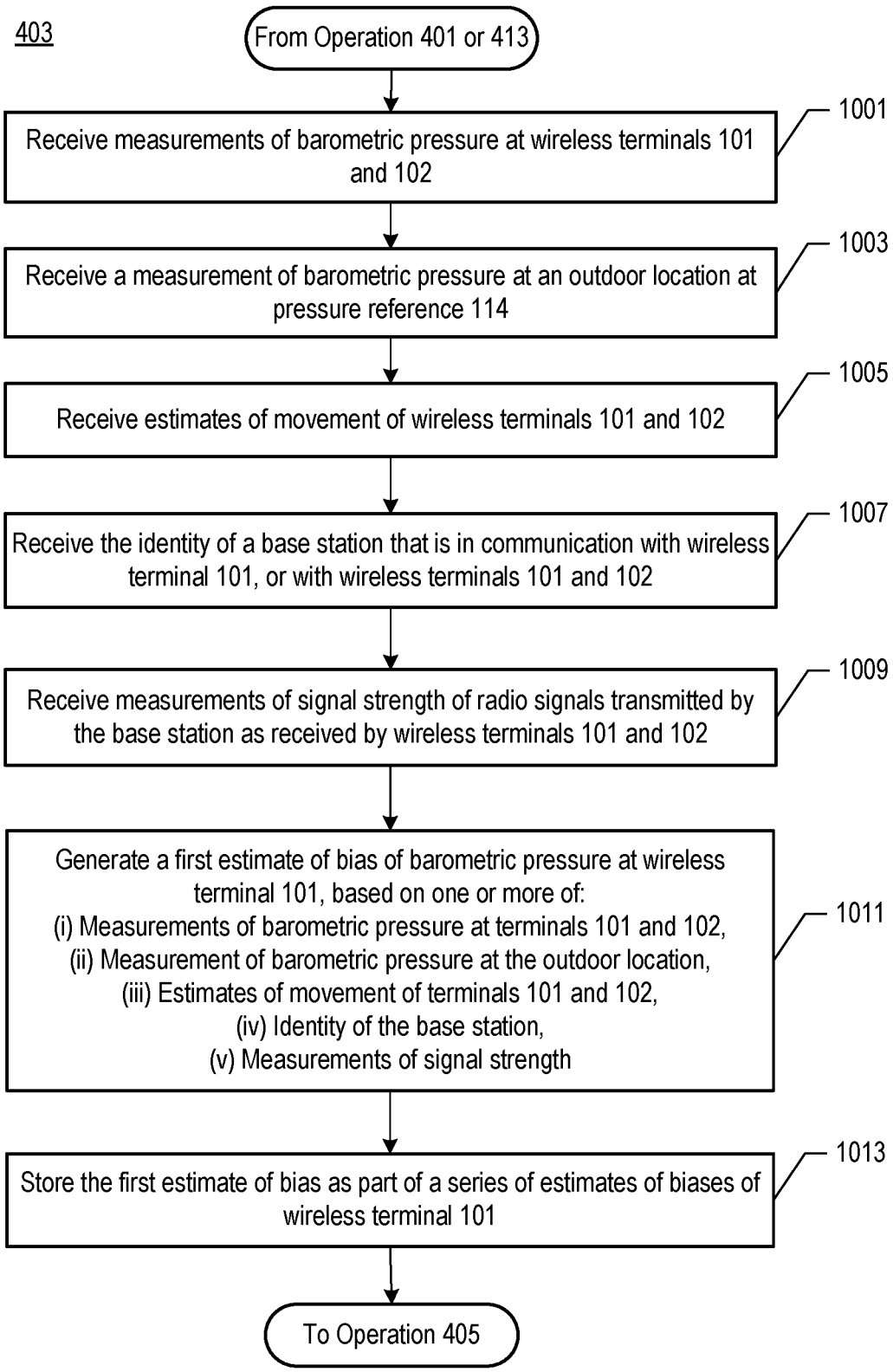
FIG. 10 depicts a flowchart of the salient processes performed in accordance with operation 403 of method 400.

FIG. 10 depicts a flowchart of the salient processes performed in accordance with operation 403.

In accordance with operation 1001, location engine 113 receives measurements of barometric pressure at wireless terminals 101 and 102. For example and without limitation, location engine 113 can receive measurements according to operation 1111 as shown and described below. The measurements of barometric pressure at wireless terminal 101 correspond to wireless terminal 101 being at or near a first lateral location, as distinguished from a second lateral location for which an estimate of elevation is to be generated.

In accordance with operation 1003, location engine 113 receives measurements of barometric pressure at pressure reference 114. For example and without limitation, location engine 113 can receive the measurements according to operation 1105 as shown and described below.

In accordance with operation 1005, location engine 113 receives or generates estimates of movement of wireless terminals 101 and 102, as described below. The estimates of movement of wireless terminal 101 correspond to wireless terminal 101 being at or near a first lateral location, as distinguished from a second lateral location for which an estimate of elevation is to be generated.

In accordance with operation 1007, location engine 113 receives the identities of one or more base stations that are in communication with wireless terminal 101, or with both wireless terminals 101 and 102. For example and without limitation, an identity of a base station can comprise the SSID of a WiFi access point (AP) and/or the media access control (MAC) address. This information can be provided by the base station itself and/or by the wireless terminal through the same base station or a different one (e.g., WiFi, cellular, etc.).

In accordance with operation 1009, location engine 113 receives measurement of signal strength of radio signals transmitted by the base station or stations, as received by wireless terminals 101 and 102. For example and without limitation, location engine 113 can receive the measurements according to operation 1207 as shown and described below.

In accordance with operation 1011, location engine 113 generates an estimate of bias of barometric pressure at wireless terminal 101, based on one or more of:
a. measurements of barometric pressure at wireless terminals 101 and 102, received in accordance with operation 1001,
b. measurements of barometric pressure at pressure reference 114, at an outdoor location, received in accordance with operation 1003,
c. estimates of movement of wireless terminals 101 and 102, received in accordance with operation 1005,
d. the identity or identities of one or more base stations, received in accordance with operation 1007, and
e. measurements of signal strength, received in accordance with operation 1009.

Location 113 generates the estimate of bias of barometric pressure at wireless terminal 101, by comparing i) the barometric pressure measured by barometer 205 of wireless terminal 101 while at that elevation and ii) the barometric pressure that corresponds to an estimated elevation of wireless terminal 101 when it made the barometric pressure measurement. The barometric pressure measured by barometer 205 corresponds to one or more of the measurements of barometric pressure at wireless terminal 101 received in accordance with operation 1001.

The received measurements of the barometric pressure at pressure reference 114 are one of the components for establishing the barometric pressure that corresponds to an estimated elevation of wireless terminal 101 when it made the barometric pressure measurement. For example, location engine 113 can derive a local barometric pressure, and, for that matter, an estimated vertical height or ground level, for the lateral location at which wireless terminal 101 provided the pressure measurements. Location engine 113 is able to do so based on one or more of the reference pressure measurements, by accounting for certain differences between the lateral location of the terminal and the locations of the one or more pressure references, and by accounting for the height (when provided) of the wireless terminal above the local terrain, in well-known fashion.

The height of wireless terminal 101 above the local terrain is unknown at this point, but location engine 113 can infer the height via one or more of the techniques described below and in accordance with the illustrative embodiment. In some embodiments of the present invention, location engine 113 first determines whether it is outdoors or indoors and selects a technique described below based on whether it is outdoors or indoors. For example and without limitation, location engine 113 can determine whether the wireless terminal is outdoors by using the results obtained by an MT-LR (Mobile-Terminated Location Request). For example, in the results obtained for the particular wireless terminal, if there is a higher number of GPS satellites reported than the average number of satellites reported, or a higher number than a predefined number reported, then it can be inferred that the wireless terminal is probably outdoors.

Inferring the Height of a Wireless Terminal that is Outdoors Based on an Estimate of Movement—

A first technique for determining the barometric pressure at wireless terminal 101's elevation comprises inferring the terminal's height above ground based on an estimate of movement of the wireless terminal. In accordance with the illustrative embodiment, the estimate of movement is the speed of the wireless terminal, while in some other embodiments the estimate of movement can be a different property than speed (e.g., acceleration, direction of movement, change in direction, etc.).

Location engine 113 infers the above-ground height of wireless terminal 101—and, hence, the barometric pressure at that height—by detecting whether wireless terminal 101 is moving in excess of a predefined speed (e.g., greater than zero, greater than a predefined positive value, etc.). For example and without limitation, if the speed of wireless terminal 101 is detected as being at highway speed, then it can be inferred that the wireless terminal is in a vehicle and is probably situated within that vehicle at a particular height (e.g., 1.2 meters above ground, etc.). In some embodiments of the present invention, location engine 113 estimates the height of the wireless terminal—and, with that, calibrates the wireless terminal's barometric sensor—opportunistically.

Location engine 113 can determine the speed of wireless terminal 101, or receive the speed information from a different source. For example and without limitation, engine 113 can rely on Global Navigation Satellite System (GNSS) (e.g., Global Positioning System [GPS], etc.) measurements.

In some embodiments of the present invention, location engine 113 bases the estimate of bias on detecting whether wireless terminal 101 is outdoors or not, in addition to detecting whether wireless terminal 101 is moving in excess of the predefined speed. The location engine can also determine that the wireless terminal is on a road (e.g., a highway, etc.) or other place in which the detected speed is plausible, by using an estimated lateral location of the wireless terminal and comparing that estimate to a geographic information system (GIS) database constructed in accordance with operation 401 described herein to determine that the wireless terminal is probably on a road.

In some embodiments of the present invention, location engine 113 bases the inference of wireless terminal 101's height—and, with that, the estimate of bias of the barometric sensor—by inferring the type of vehicle that the terminal is situated in. For example and without limitation, location engine 113 can infer wireless terminal 101 to be i) at a first predefined height above the ground (e.g., 1.2 meters, etc.) if it is determined to be within a first type of vehicle (e.g., a car, etc.) and ii) at a second predefined height above the ground (e.g., 2.0 meters, etc.) if it is determined to be within a second type of vehicle (e.g., a bus, etc.). Location engine 113 can infer the type of vehicle based on i) whether other wireless terminals are moving in unison with terminal 101 (suggesting multiple terminals being situated within the same vehicle), ii) known restrictions of certain roads of certain types of vehicles (eliminating some possible vehicles from consideration), and so on.

In some embodiments of the present invention, location engine 113 bases the estimate of bias based on inferring that wireless terminal 101 is i) at a first predefined height above the ground if detected to be moving in excess of a predefined speed and ii) at a second predefined height above the ground if detected to be not moving in excess of the predefined speed. For example and without limitation, if the speed of wireless terminal 101 is detected as being at highway speed, then it can be inferred that the wireless terminal is in a vehicle and is probably situated within that vehicle at a first particular height (e.g., 1.2 meters above ground, etc.), but if the speed is detected as being consistently at a walking pace, then it can be inferred that the wireless terminal is in someone's pocket or handbag, accordingly at a second particular height (e.g., 0.9 meters above ground, etc.).

The location engine can also determine that the wireless terminal is off a road (e.g., a highway, etc.) or other place in which the detected pedestrian speed is plausible, but still outdoors, by comparing an estimate of the terminal's lateral location to a geographic information system (GIS) database constructed in accordance with operation 401 described herein and determining that the terminal is not on a road. The location engine can further determine that the wireless terminal is on the person of a pedestrian, but still outdoors, by comparing an estimate of the terminal's lateral location to the GIS database and determining that the terminal is away from a building.

Inferring the Height of a Wireless Terminal that is Estimated as being Indoors—

A second technique for determining the barometric pressure at wireless terminal 101's elevation comprises inferring the terminal's height above ground based on information related to an Access Point (e.g., a WiFi access point, etc.) or other indoor transmitter. In accordance with the illustrative embodiment, in order to infer the height of wireless terminal 101, location engine 113 uses a previously-calibrated wireless terminal such as wireless terminal 102, for example, that is reporting the same WiFi access point as wireless terminal 101.

Location engine 113 regards wireless terminals that are reporting the same WiFi access point (AP) with a sufficiently strong signal (e.g., a signal exceeding a predefined threshold, etc.), or same-floor APs with strong signals, as probably being on the same building floor as the AP(s) and as one another. Location engine 113 determines the height of wireless terminal 102 (e.g., in accordance with operation 411, etc.), infers the height of wireless terminal 101 as being that of terminal 102, and estimates the bias of wireless terminal 101's barometer accordingly. In other words, once the barometric device of a first wireless terminal is sufficiently calibrated, the barometers of other wireless terminals that are inferred in the aforementioned manner to be on the same floor as the first wireless terminal can be calibrated based on the inference.

As described above, location engine 113 generates the estimate of bias of barometric pressure based on a measurement of signal strength of a radio signal transmitted by a WiFi access point (i.e., a base station) as received by wireless terminal 101. In some embodiments of the present invention, location engine 113 can generate the estimate of bias of barometric pressure further based on a measurement of signal strength of a radio signal transmitted by a WiFi access point (i.e., a base station) as received by a different, additional wireless terminal (e.g., wireless terminal 102, etc.). In some alternative embodiments of the present invention, location engine 113 generates the estimate of bias of barometric pressure based on a location-dependent trait different from the signal strength of a radio signal.

Alternatively, location engine 113 can be provided with the floor—and, therefore, the height—of the access point (AP) itself whose identity is reported by wireless terminal 101; the AP's floor information can be provided from a previously constructed WiFi AP database. Location engine 113 then converts the floor information to a true pressure at the height of the floor, wherein the true pressure is derived from one or more measurements received from the outdoor locations of pressure references, including reference 114. Then, as described elsewhere herein, location engine 113 compares the true pressure with the pressure measured by wireless terminal 101 in order to get the barometer sensor bias of the wireless terminal. In some embodiments of the present invention, generating the AP database and determining the sensor bias can be performed together as a joint estimation problem involving a sufficiently large number of wireless terminals that are reporting barometer measurements and/or WiFi APs around them.

Adjusting the Estimated Elevation of a Wireless Terminal Based on GIS Boundaries—

In some embodiments of the present invention, location engine 113 accounts for one or more GIS boundaries in determining the estimated elevation (comprising the inferred above-ground height) of wireless terminal 101 when it made the barometric pressure measurement. This operation is based on the rationale that a location estimate of a wireless terminal—and, by extension, its barometer—should correspond to being situated somewhere within a habitable region. An out-of-region estimate of elevation normally should result in a lower bounding or an upper bounding of the barometer's calibration. Location engine 113 determines the lower and/or upper bound of the habitable region of wireless terminal 101, by obtaining an estimated lateral location and comparing the lateral location to a GIS database such as the one constructed in accordance with operation 501 described above.

If, for example, a raw estimate of elevation of wireless terminal 101 suggests that the terminal is in a subterranean region that does not actually exist within a particular building, then location engine 113 introduces a correction such that the estimate of elevation corresponds to an actual space (e.g., the lowest floor level) within the building. Location engine 113 then proceeds to generate an estimate of the measurement bias of wireless terminal 101's barometer based on the height adjusted by the applicable GIS boundaries.

Storing the Estimate of Bias—

In accordance with operation 1013, location engine 113 stores the estimate of bias as part of a series of estimates of bias of barometric pressure at wireless terminal 101, wherein the series further comprises estimates of bias generated in previous or subsequent iterations of operation 403. In some embodiments of the present invention, location engine 113 performs calibration of wireless terminal 101's barometer repeatedly (e.g., periodically, sporadically, on-demand, etc.), in order to account for any drift of the barometric pressure measurements that can be attributed to the aging of the barometric sensor and other possible characteristics (e.g., temperature, humidity, etc.), temporal-dependent or otherwise. In some embodiments of the present invention, location engine 113 triggers re-calibration based on a predefined change in temperature and/or humidity measured by wireless terminal 101, over a period of time.

Operation 405: Collect Barometric Measurements—

Figure 11:
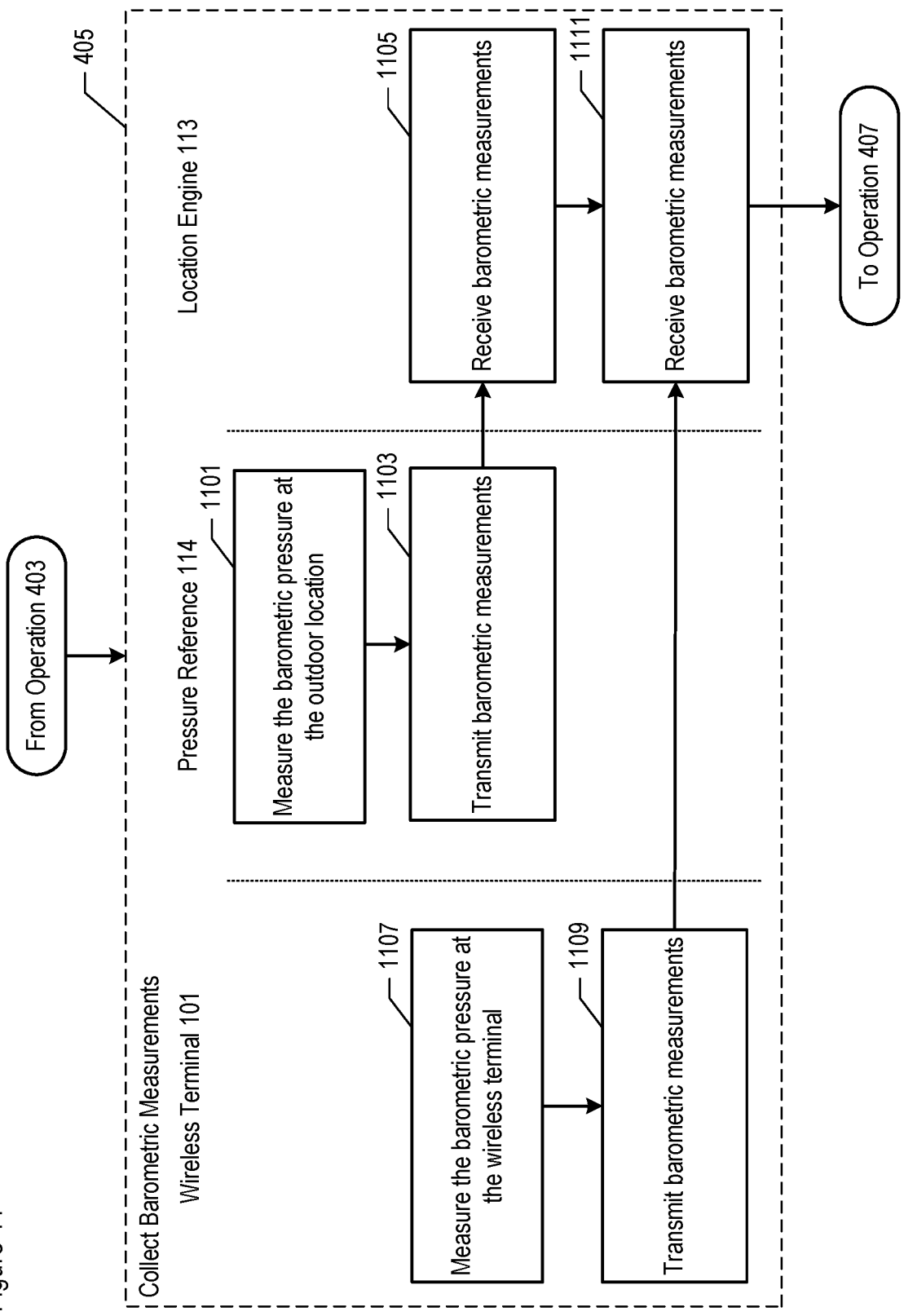
FIG. 11 depicts a flowchart of the salient processes performed in accordance with operation 405 of method 400.

FIG. 11 depicts a flowchart of the salient processes performed in accordance with operation 405. For illustrative purposes, wireless terminal 101 is depicted as performing the various operations in FIG. 11 and FIG. 12. It will be clear to those skilled in the art after reading this specification, however, how to make and use embodiments of the present invention in which other wireless terminals (e.g., wireless terminal 102, etc.) perform at least some of the operations that wireless terminal 101 is depicted as performing, in addition to or instead of wireless terminal 101. In accordance with the illustrative embodiment, the collected data corresponds to a location of wireless terminal 101 that is different from the location associated with the data collected for wireless terminal 101 at operation 403.

In accordance with operation 1101, pressure reference 114 measures samples of barometric pressure, $P_T$, in its vicinity. In some embodiments of the present invention, each sample represents one measurement of barometric pressure, while in some other embodiments each sample comprises more than one measurement of barometric pressure.

In accordance with operation 1103, pressure reference 114 transmits a measurement of atmospheric pressure, $P_W$, (i.e., provides a measurement of barometric pressure at an outdoor location) to location engine 113. In accordance with the illustrative embodiment, operation 1103 is performed every 10 minutes, but it will be clear to those skilled in the art how to make and use alternative embodiments of the present invention that transmit the measurements at other times.

In accordance with operation 1105, location engine 113 receives the barometric pressure samples transmitted in accordance with operation 1103.

In accordance with operation 1107, wireless terminal 101 measures samples of barometric pressure, $P_T$, in its vicinity by using barometer 205. In some embodiments of the present invention, each sample represents one measurement of barometric pressure, while in some other embodiments each sample comprises more than one measurement of barometric pressure. In accordance with the illustrative embodiment, a measurement of barometric pressure is taken once per second, but it will be clear to those skilled in the art how to make and use alternative embodiments of the present invention that take the measurements at a different rate (e.g., 5 per second, 10 per second, etc.).

In accordance with operation 1109, wireless terminal 101 transmits the samples of barometric pressure, $P_T$, to location engine 113. In accordance with the illustrative embodiment, operation 1109 is performed every 5 seconds, but it will be clear to those skilled in the art how to make and use alternative embodiments of the present invention that transmit the samples of barometric pressure at other times.

In accordance with operation 1111, location engine 113 receives the barometric pressure samples transmitted in accordance with operation 1109. In some embodiments of the present invention, location engine 113 combines the values of multiple pressure samples (e.g., by calculating a median, etc.) in order to reduce measurement noise.

Operations 1101 through 1111 are performed continuously, concurrently, and asynchronously, in accordance with the illustrative embodiment.

Operation 407: Collect Empirical Data on Radio Signals—

Figure 12:
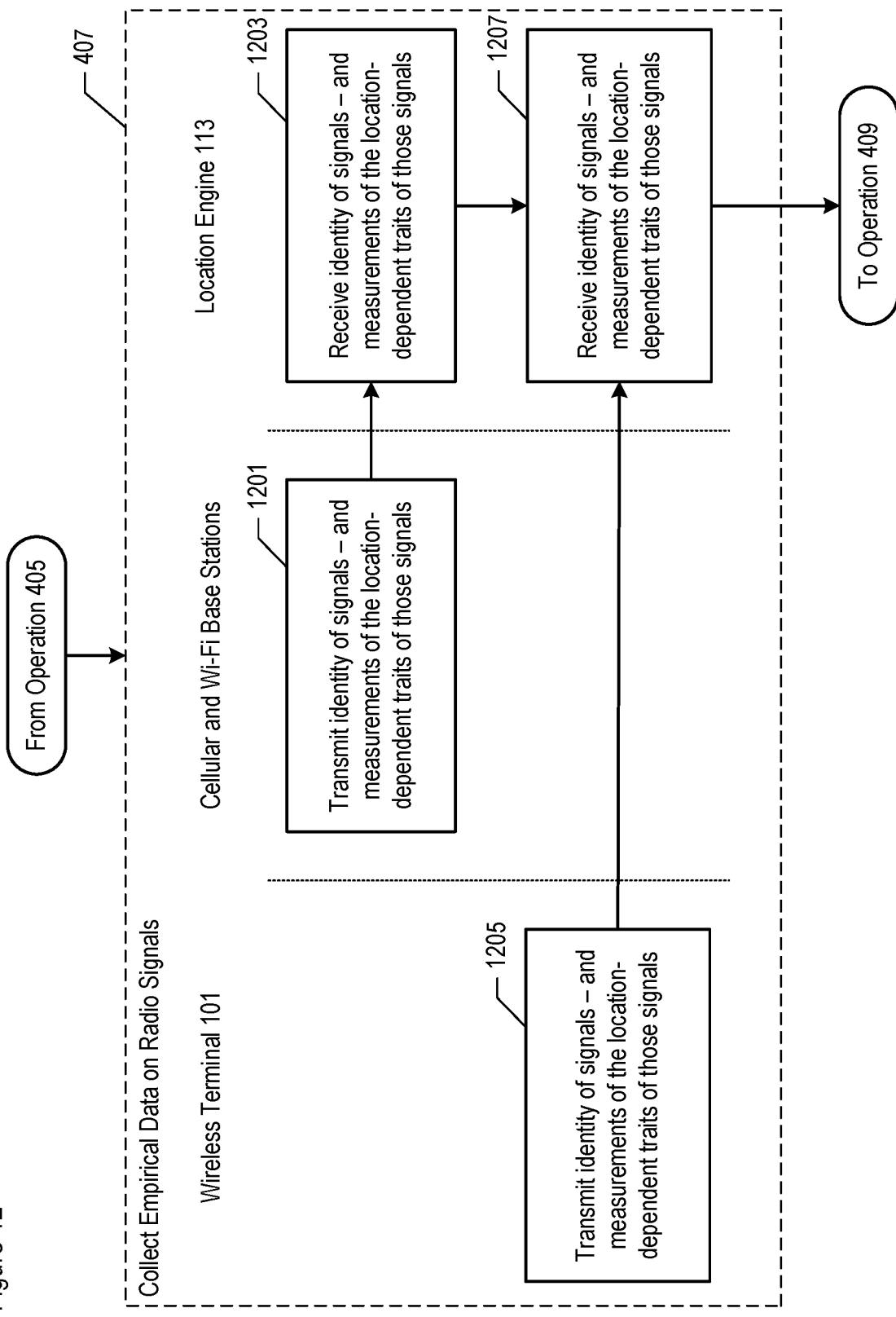
FIG. 12 depicts a flowchart of the salient processes performed in accordance with operation 407 of method 400

FIG. 12 depicts a flowchart of the salient processes performed in accordance with operation 407. In accordance with the illustrative embodiment, the collected data corresponds to a location of wireless terminal 101 that is different from the location associated with the data collected for wireless terminal 101 at operation 403.

At operation 1201, each of cellular base stations 103-1, 103-2, and 103-3 and Wi-Fi base stations 104-1 and 104-2 transmits the identity of each signal it has received from wireless terminal 101 and the measurements of the location-dependent traits of those signals—though not necessarily simultaneously or synchronously with one another. In accordance with the illustrative embodiment, operation 1201 is performed every 20 milliseconds, but it will be clear to those skilled in the art how to make and use alternative embodiments of the present invention that transmit the measurements at other times.

At operation 1203, location engine 113 receives the identities and measurements transmitted at operation 1201.

At operation 1205, wireless terminal 101 transmits the identity of each signal it receives from cellular base stations 103-1, 103-2, and 103-3 and Wi-Fi base stations 104-1 and 104-2 and the measurements of the location-dependent traits of those signals. In accordance with the illustrative embodiment, operation 1205 is performed every 20 milliseconds, but it will be clear to those skilled in the art how to make and use alternative embodiments of the present invention that transmit the measurements at other times.

At operation 1207, location engine 113 receives the identities and measurements transmitted at operation 1205.

Operations 1201 through 1207 are performed continuously, concurrently, and asynchronously, in accordance with the illustrative embodiment.

Operation 411: Estimate the Elevation of Wireless Terminal 101—

Figure 13:
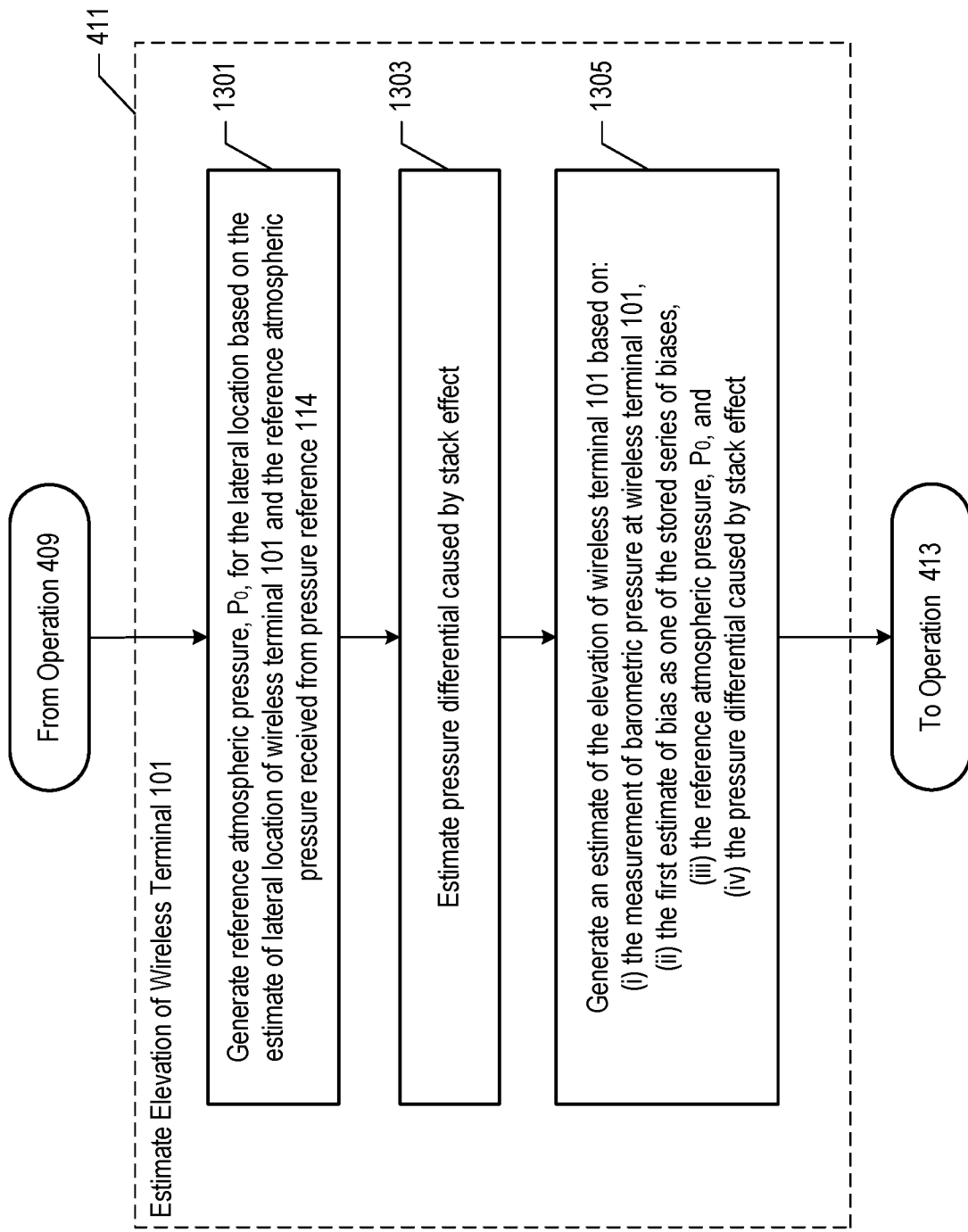
FIG. 13 depicts a flowchart of the salient processes performed in accordance with operation 411 of method 400.

FIG. 13 depicts a flowchart of the salient processes performed in accordance with operation 411.

At operation 1301, location engine 113 generates, $P_0$, which is an estimate of the reference atmospheric pressure for the lateral location estimated in accordance with operation 409 and within geographic location 120, based on:

$$P_0 = \frac{P_W}{e^{-\left(\frac{Z_W}{H}\right)}} \quad \text{(Eq. 2)}$$

wherein:
- $P_W$ is the measurement of atmospheric pressure received from pressure reference 114 that most closely corresponds in time to the measurement of atmospheric pressure of interest received from wireless terminal 101, $P_T$,
- $Z_W$ is the elevation of pressure reference 114 (1000 meters in the illustrative embodiment), and
- H is the scale height of the atmosphere, which is the elevation at which the atmospheric pressure has decreased to $e^{-1}$ times its value at mean sea level (e.g., approximately 7000 meters).

As those who are skilled in the art will appreciate after reading this specification, in some alternative embodiments $P_0$ can be determined using a different equation than that described above.

In accordance with the illustrative embodiment, location engine 113 has access to multiple pressure references, such as reference 114, and uses a measurement $P_W$ from the pressure reference that is the closest to the lateral location estimated in accordance with operation 409, along with the $Z_W$ corresponding to said pressure reference. In some embodiments of the present invention, location engine 113 uses a measurement $P_W$ from the pressure reference that is most closely related to the lateral location estimated in accordance with operation 409, in some other way than closest distance.

In some alternative embodiments of the present invention, $P_W$ and corresponding $Z_W$ are generated from the data originating from a plurality of pressure references, including reference 114, as part of a pressure reference network.

At operation 1303, location engine 113 generates an estimate of the pressure differential, $P_M$, based on a stack-effect compensation model. For details on a stack-effect compensation model, see for example and without limitation U.S. Pat. No. 9,237,423, which is incorporated by reference. It will be clear to those skill in the art, after reading this disclosure, how to make and use embodiments of the present invention that perform operation 1303.

At operation 1305, location engine 113 generates an estimate of the elevation of wireless terminal 101, $Z_T$, based on:

$$Z_T = -H\ln\left(\frac{P_T - P_M}{P_0}\right) \quad \text{(Eq. 3)}$$

wherein:
- H is the scale height of the atmosphere (described above),
- $P_T$ is the relevant measurement of atmospheric pressure received from wireless terminal 101, adjusted by the estimate of bias of barometric pressure at wireless terminal 101 that is generated by location engine 113 in accordance with operation 1011, $P_M$ is the pressure differential determined in accordance with operation 1303, and $P_0$ is the reference atmospheric pressure determined in accordance with operation 1301.

As those who are skilled in the art will appreciate after reading this specification, in some alternative embodiments $Z_T$ can be determined using a different equation than that described above.

In some embodiments of the present invention, location engine 113 determines $P_T$ by adjusting the measurement of atmospheric pressure received from wireless terminal 101 by accounting for more than one estimate of bias of barometric pressure measured by wireless terminal 101, stored as a series in accordance with operation 1013. At least some of the estimates of bias in the series can be averaged or otherwise combined in some way, resulting in a value that is used to adjust the pressure measurement from wireless terminal 101. For example and without limitation, the estimates of bias of barometric pressure in the series can be weighted according to their relative ages in the series (e.g., more recent estimates of bias carrying greater weight, etc.), prior to being used in the adjustment.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method of estimating the elevation of a wireless terminal, the method comprising:
    generating, by the wireless terminal, an estimate of movement of the wireless terminal;
    taking a first set of samples of barometric pressure, by the wireless terminal while at a first location, resulting in a first measurement of barometric pressure made by the wireless terminal;
    inferring, from the estimate of movement of the wireless terminal, an inferred height of the wireless terminal;
    generating a first estimate of bias of barometric pressure measured by the wireless terminal based on:
        (i) the inferred height of the wireless terminal, and
        (ii) the first measurement of barometric pressure made by the wireless terminal;
    taking a second set of samples of barometric pressure, by the wireless terminal while at a second location, resulting in a second measurement of barometric pressure made by the wireless terminal;
    obtaining an estimate of a lateral location of the wireless terminal; and
    generating an estimate of the elevation of the wireless terminal based on:
        (i) the estimate of the lateral location of the wireless terminal,
        (ii) the second measurement of barometric pressure made by the wireless terminal, and
        (iii) the first estimate of bias.

2. The method of claim 1 further comprising transmitting the estimate of elevation of the wireless terminal to a location-based application server.

3. The method of claim 1 wherein the estimate of movement of the wireless terminal is an estimate of the speed of the wireless terminal.

4. The method of claim 1 wherein the first estimate of bias of barometric pressure is further based on detecting whether the wireless terminal is moving in excess of a predefined speed.

5. The method of claim 4 wherein the first estimate of bias of barometric pressure is further based on determining that the wireless terminal is at i) a first height above the ground if detected to be moving in excess of the predefined speed and ii) a second height above the ground if detected to be not moving in excess of the predefined speed.

6. The method of claim 1 further comprising:
    receiving, by the wireless terminal, a measurement of barometric pressure at an outdoor location;
    wherein the first estimate of bias of barometric pressure is further based on the measurement of barometric pressure at the outdoor location.

7. The method of claim 1 wherein the estimate of the elevation of the wireless terminal is further based on a generated series of more than one estimate of bias of barometric pressure measured by the wireless terminal, wherein the series comprises the first estimate of bias of barometric pressure, and wherein the first estimate of bias of barometric pressure is weighted according to its relative age in the series.

8. A method of estimating the elevation of a wireless terminal, the method comprising:
    generating, by the wireless terminal, an estimate of the speed of the wireless terminal;
    taking a first set of samples of barometric pressure, by the wireless terminal while at a first location, resulting in a first measurement of barometric pressure made by the wireless terminal;
    inferring, from the estimate of the speed of the wireless terminal, an inferred height of the wireless terminal;
    generating a first estimate of bias of barometric pressure measured by the wireless terminal based on:
        (i) the inferred height of the wireless terminal, and
        (ii) the first measurement of barometric pressure made by the wireless terminal;
    taking a second set of samples of barometric pressure, by the wireless terminal while at a second location, resulting in a second measurement of barometric pressure made by the wireless terminal; and
    generating an estimate of the elevation of the wireless terminal based on:
        (i) the second measurement of barometric pressure made by the wireless terminal, and
        (ii) the first estimate of bias.

9. The method of claim 8 further comprising transmitting the estimate of elevation of the wireless terminal to a location-based application server.

10. The method of claim 8 wherein the first estimate of bias of barometric pressure is further based on detecting whether the wireless terminal is outdoors.

11. The method of claim 8 wherein the first estimate of bias of barometric pressure is further based on detecting whether the wireless terminal is moving in excess of a predefined speed.

12. The method of claim 11 wherein the first estimate of bias of barometric pressure is further based on determining that the wireless terminal is at i) a first height above the ground if detected to be moving in excess of the predefined speed and ii) a second height above the ground if detected to be not moving in excess of the predefined speed.

13. The method of claim 8 further comprising:
    receiving, by the wireless terminal, a measurement of barometric pressure at an outdoor location;

wherein the first estimate of bias of barometric pressure is further based on the measurement of barometric pressure at the outdoor location.

14. The method of claim 8 wherein the estimate of the elevation of the wireless terminal is further based on a generated series of more than one estimate of bias of barometric pressure measured by the wireless terminal, wherein the series comprises the first estimate of bias of barometric pressure, and wherein the first estimate of bias of barometric pressure is weighted according to its relative age in the series.

15. A method of estimating the elevation of a wireless terminal, the method comprising:
generating, by the wireless terminal, an estimate of movement of the wireless terminal;
taking a first set of samples of barometric pressure, by the wireless terminal while at a first location, resulting in a first measurement of barometric pressure made by the wireless terminal;
inferring an inferred height of the wireless terminal, wherein the inferred height is based on (i) the estimate of movement of the wireless terminal and (ii) detecting whether the wireless terminal is outdoors;
generating a first estimate of bias of barometric pressure measured by the wireless terminal based on:
(i) the inferred height of the wireless terminal, and
(ii) the first measurement of barometric pressure made by the wireless terminal;
taking a second set of samples of barometric pressure, by the wireless terminal while at a second location, resulting in a second measurement of barometric pressure made by the wireless terminal; and
generating an estimate of the elevation of the wireless terminal based on:
(i) the second measurement of barometric pressure made by the wireless terminal, and
(ii) the first estimate of bias.

16. The method of claim 15 further comprising transmitting the estimate of elevation of the wireless terminal to a location-based application server.

17. The method of claim 15 wherein the first estimate of bias of barometric pressure is further based on detecting whether the wireless terminal is moving in excess of a predefined speed.

18. The method of claim 17 wherein the first estimate of bias of barometric pressure is further based on determining that the wireless terminal is at i) a first height above the ground if the wireless terminal is detected to be moving in excess of the predefined speed and ii) a second height above the ground if the wireless terminal is detected to be not moving in excess of the predefined speed.

19. The method of claim 15 further comprising:
receiving, by the wireless terminal, a measurement of barometric pressure at an outdoor location;
wherein the first estimate of bias of barometric pressure is further based on the measurement of barometric pressure at the outdoor location.

20. The method of claim 15 wherein the estimate of the elevation of the wireless terminal is further based on a generated series of more than one estimate of bias of barometric pressure measured by the wireless terminal, wherein the series comprises the first estimate of bias of barometric pressure, and wherein the first estimate of bias of barometric pressure is weighted according to its relative age in the series.

* * * * *